(12) United States Patent
Huang et al.

(10) Patent No.: US 11,732,852 B2
(45) Date of Patent: Aug. 22, 2023

(54) DOWNLIGHT APPARATUS

(71) Applicant: XIAMEN ECO LIGHTING CO. LTD., Xiamen (CN)

(72) Inventors: Huiyong Huang, Xiamen (CN); Zhenyu Tang, Xiamen (CN); Shuxing Gao, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 0 days.

(21) Appl. No.: 17/470,922

(22) Filed: Sep. 9, 2021

(65) Prior Publication Data

US 2022/0074557 A1 Mar. 10, 2022

(30) Foreign Application Priority Data

| Sep. 9, 2020 | (CN) | 202021962277.X |
| Sep. 9, 2020 | (CN) | 202021962480.7 |
| Sep. 9, 2020 | (CN) | 202021962759.5 |
| Sep. 9, 2020 | (CN) | 202021963435.3 |
| Sep. 9, 2020 | (CN) | 202021963476.2 |
| Sep. 10, 2020 | (CN) | 202021973305.8 |
| Sep. 10, 2020 | (CN) | 202021973469.0 |
| Sep. 10, 2020 | (CN) | 202021973704.4 |
| Sep. 10, 2020 | (CN) | 202021973937.4 |
| Sep. 10, 2020 | (CN) | 202021974013.6 |
| Sep. 10, 2020 | (CN) | 202021974312.X |

(Continued)

(51) Int. Cl.
*F21S 8/02* (2006.01)
*F21V 21/04* (2006.01)
(Continued)

(52) U.S. Cl.
CPC .......... *F21S 8/026* (2013.01); *F21S 8/02* (2013.01); *F21V 15/01* (2013.01); *F21V 21/04* (2013.01); *F21V 21/14* (2013.01); *F21V 21/26* (2013.01); *F21V 23/003* (2013.01); *F21V 23/007* (2013.01); *F21V 23/04* (2013.01);
(Continued)

(58) Field of Classification Search
CPC .......... F21S 8/026; F21V 29/70; F21V 21/04; F21V 23/003; F21V 23/04
See application file for complete search history.

(56) References Cited

U.S. PATENT DOCUMENTS 10,281,120 B1 * 5/2019 Winslett ............... F16M 13/022
11,098,885 B1 * 8/2021 Huang ................. F21V 23/007
(Continued)

*Primary Examiner* — Leah Simone Macchiarolo
(74) *Attorney, Agent, or Firm* — Chun-Ming Shih; Lanway IPR Services

(57) ABSTRACT

A downlight apparatus includes a driver box, a light source, a light housing, multiple leaf springs, multiple shaft connectors and multiple pads. The light housing has a light holder and a rim. The light holder has a holder plate and a holder wall defining a holder cavity. The multiple leaf springs are placed between the driver box and the light holder. Each pad has a pad hole and a pad scraper surrounding the pad hole. The pad scraper has a protruding part engaging an electric insulation layer on a top side of the holder plate. The shaft connector sequentially passes through a spring hole of the leaf spring, the pad hole and the top plate of the light holder. The protruding part of the pad scraper scraps a portion of the electric insulation layer of the holder plate for connecting the holder plate to ground.

20 Claims, 47 Drawing Sheets

(30) Foreign Application Priority Data

Sep. 10, 2020 (CN) .......................... 202021974314.9
Sep. 10, 2020 (CN) .......................... 202021974622.1

(51) Int. Cl.
  *F21V 23/00* (2015.01)
  *F21V 23/04* (2006.01)
  *F21V 21/14* (2006.01)
  *F21V 29/70* (2015.01)
  *F21V 15/01* (2006.01)
  *F21V 8/00* (2006.01)
  *F21V 21/26* (2006.01)
  *F21Y 115/10* (2016.01)

(52) U.S. Cl.
  CPC ............ *F21V 29/70* (2015.01); *G02B 6/0085* (2013.01); *F21V 21/047* (2013.01); *F21V 21/049* (2013.01); *F21Y 2115/10* (2016.08)

(56) References Cited

U.S. PATENT DOCUMENTS

| | | | | |
|---|---|---|---|---|
| 2008/0106907 A1* | 5/2008 | Trott | ................ | F21V 29/89 362/368 |
| 2019/0101266 A1* | 4/2019 | Shah | ................ | F21S 8/02 |
| 2020/0340651 A1* | 10/2020 | Huang | ................ | F21V 23/04 |

* cited by examiner

C – C

D–D

DOWNLIGHT APPARATUS

FIELD

The present invention is related to a downlight apparatus, and more particularly related to a downlight apparatus with electric safety design.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

Downlight devices are widely used in various places. It is beneficial to find out improvements of downlight devices to provide a more convenient and more safe downlight products.

It is important to keep a downlight device safe for considering grounding.

SUMMARY

In some embodiments, a downlight apparatus includes a driver box, a light source, a light housing, multiple leaf springs, multiple shaft connectors and multiple pads.

The light housing has a light holder and a rim.

The light holder has a holder plate and a holder wall defining a holder cavity.

The light source is placed on an inner side of the holder plate in the holder cavity.

The multiple leaf springs are placed between the driver box and the light holder.

Each pad has a pad hole and a pad scraper surrounding the pad hole.

The pad scraper has a protruding part engaging an electric insulation layer on a top side of the holder plate.

The shaft connector sequentially passes through a spring hole of the leaf spring, the pad hole and the top plate of the light holder.

The protruding part of the pad scraper scraps a portion of the electric insulation layer of the holder plate for connecting the holder plate to ground.

In some embodiments, the leaf spring has a spring head and spring tail.

The spring tail is rotated to extend outside the light holder.

In some embodiments, the shaft connector is a first screw.

In some embodiments, the first screw is rotated to carry the pad scraper to move for removing the portion of the electric insulation layer.

In some embodiments, when the leaf spring is rotated, the pad scraper is moved to erase the portion of the electric insulation layer.

In some embodiments, a bottom edge of the driver box has multiple rotation grooves for the spring tails to extend and moving the multiple rotation grooves.

In some embodiments, a limiting unit is placed between the driver box and the light holder for limiting rotation of the leaf springs.

In some embodiments, the pad scraper is a circular wave structure.

In some embodiments, the protruding part is roughened to increase friction.

In some embodiments, the pads and the shaft connectors are made of metal material.

In some embodiments, the spring tail is extended for engaging a platform cavity for keeping the downlight apparatus in the platform cavity.

In some embodiments, a driver plate is placed inside the driver box.

The driver plate is kept a distance from a bottom of the driver box and the light holder.

In some embodiments, the light source has a light source plate mounted with LED modules.

The light source plate is connected to the light holder to connect to the ground.

In some embodiments, multiple metal shafts are used for electrically connecting the light source plate and the light holder.

In some embodiments, the leaf spring engages a junction box to connect to the ground.

In some embodiments, the shaft connector is electrically connected to a ground electrode disposed inside the driver box.

In some embodiments, a top plate of the driver box has a wire socket and a manual switch.

The wire socket is connected to a power wire and the manual switch is used for adjusting a setting of the light source.

In some embodiments, the top plate of the driver box further has a rotation switch for continuously setting a maximum light intensity of the light source.

In some embodiments, a heat dissipation plate is placed between the light holder and the driver box for carrying away both heat of the driver box and the light source.

In some embodiments, the heat dissipation plate has a portion not covered by the light holder and the driver box.

DETAILED DESCRIPTION

Figure 87:
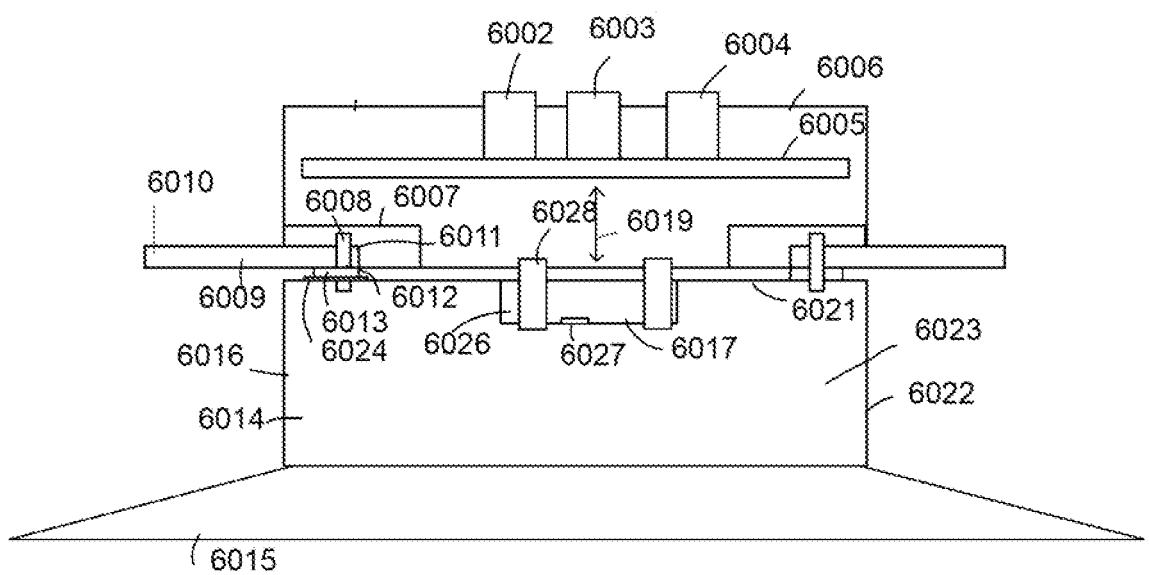
FIG. 87 shows another downlight apparatus embodiment.

Please refer to FIG. 87, which illustrates a downlight apparatus example.

In FIG. 87, a downlight apparatus includes a driver box 6006, a light source 6017, a light housing 6016, multiple leaf springs 6009, multiple shaft connectors 6008 and multiple pads 6013.

The light housing 6016 has a light holder 6014 and a rim 6015. The rim 6015 has a larger diameter than the light holder 6014. In some embodiments, the downlight apparatus is installed in a cavity or a junction box of a ceiling. The rim 6015 conceals the downlight body in the cavity, except exposing a light opening for light to emit outside the downlight apparatus.

The light holder 6014 has a holder plate 6021 and a holder wall 6022 defining a holder cavity 6023.

The light source 6017 is placed on an inner side of the holder plate 6021 in the holder cavity 6023.

The multiple leaf springs 6009 are placed between the driver box 6006 and the light holder 6016.

Each pad 6013 has a pad hole and a pad scraper surrounding the pad hole.

Figure 16:
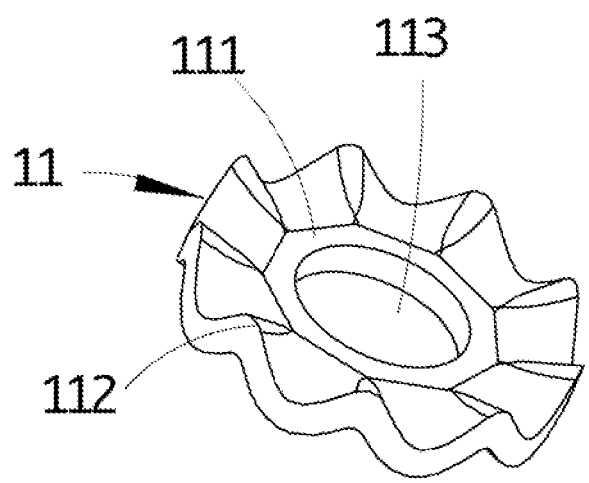
FIG. 16 illustrates an example of a wave structure pad.

FIG. 16 shows an example of such pad in more detail. In FIG. 16, the pad 11 has a pad hole 113 and a pad scraper 112. The pad scraper 112 are extended from an inner ring 111. The pad scraper 112 has a protruding part, e.g. with a wave structure with protruding portions extending above the central body.

In FIG. 87, the pad scraper engaging an electric insulation layer 6024 on a top side of the holder plate 6021.

The shaft connector 6008 sequentially passes through a spring hole 6012 of the leaf spring 6010, the pad hole and the top plate 6021 of the light holder 6016.

The protruding part of the pad scraper scraps a portion of the electric insulation layer 6024 of the holder plate 6021 for connecting the holder plate 6021 to ground.

For example, an electric insulation paint is attached on surface of a metal light holder 6016 to form an electric insulation layer mentioned here. To prevent electric shock for users to touch the light housing, it is important to get the light housing to a ground, particularly when the light housing is made of metal material.

In such case, the light housing is connected to ground via the shaft connector 6008, e.g. a metal screw or a metal shaft. Sometimes, the light housing is attached with electric insulation layer. The pad scraper is used for removing a portion of electric insulation layer to connect the light housing to ground.

In some embodiments, the leaf spring has a spring head 6011 and spring tail 6010.

The spring tail 6010 is rotated to extend outside the light holder 6016.

Figure 14:
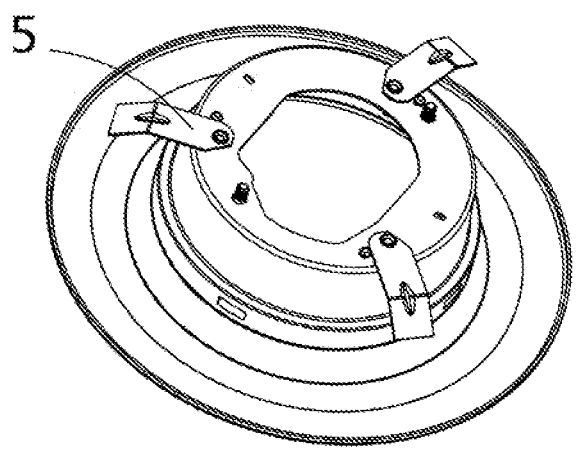
FIG. 14 illustrates another example of a light housing.

For example, FIG. 14 shows three leaf springs 5 are disposed on a light housing to rotate extending outside the light housing so as to expand a diameter to keep the downlight apparatus in a cavity or a junction box. The leaf springs may be rotated to expand or decrease the expanding diameter to attach or to detach the downlight from the installation cavity.

In some embodiments, the shaft connector is a first screw.

In some embodiments, the first screw is rotated to carry the pad scraper to move for removing the portion of the electric insulation layer. For example, the screw is fixed to the pad scraper so that when the screw is rotated, the pad scraper is rotated too. When the pad scraper rotates, it engages and removes a portion of the electric insulation layer on the light holder to get the leaf spring electrically connected to the light housing and then to connect to a ground.

In some embodiments, when the leaf spring is rotated, the pad scraper is moved to erase the portion of the electric insulation layer. Another design is to keep the pad scraper to move with the leaf spring. As mentioned above, the leaf spring is rotated when installing the downlight apparatus to a cavity or a junction box. In such way, the pad scraper is carried to move for removing the portion of electric insulation layer on the light holder.

In FIG. 87, a bottom edge of the driver box has multiple rotation grooves 6007 for the spring tails to extend and move the multiple rotation grooves.

In some embodiments, a limiting unit is placed between the driver box and the light holder for limiting rotation of the leaf springs.

Figure 6:
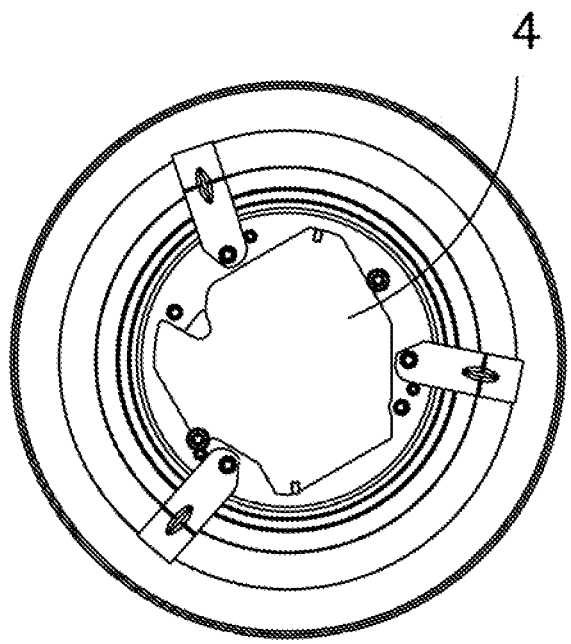
FIG. 6 illustrates a top view of the example in FIG. 5.

FIG. 6 shows such an example. The leaf spring is limited by the limiting unit within a rotation angle.

In some embodiments, the pad scraper is a circular wave structure.

FIG. 16 shows such an example of such pad scraper 112.

In some embodiments, the protruding part is roughened to increase friction so as to more easily remove the surface paint on the light holder.

In some embodiments, the pads and the shaft connectors are made of metal material.

In some embodiments, the spring tail is extended for engaging a platform cavity for keeping the downlight apparatus in the platform cavity.

In FIG. 87, a driver plate 6005 is placed inside the driver box 6006.

The driver plate 6005 is kept a distance 6019 from a bottom of the driver box 6006 and the light holder 6016.

In some embodiments, the light source 6017 has a light source plate 6016 mounted with LED modules 6027.

The light source plate 6026 is connected to the light holder 6016 to connect to the ground.

In some embodiments, multiple metal shafts 6028 are used for electrically electrically connecting the light source plate 6026 and the light holder 6016.

In some embodiments, the leaf spring engages a junction box to connect to the ground. Junction boxes are used widely in some countries and are known to persons of ordinary skilled in the art and thus are not illustrated. The junction box may be connected to ground. When the leaf spring engages the junction box, the light housing is also connected to the ground with the connection to the leaf spring.

In some embodiments, the shaft connector is electrically connected to a ground electrode disposed inside the driver box. For example, a ground electrode may be placed in the driver box 6006 to further connecting to a ground wire connecting to a ground.

In some embodiments, a top plate of the driver box has a wire socket 6002 and a manual switch 6003. The manual switch 6003 may be operated to change a setting, e.g. a mixed light color temperature, a mixed light color, or other parameter. The wire socket 6002 may be used for connecting a power wire and/or a ground wire.

The wire socket is connected to a power wire and the manual switch is used for adjusting a setting of the light source.

In some embodiments, the top plate of the driver box further has a rotation switch 6004 for continuously setting a maximum light intensity of the light source. For example, the light source may emit an X light intensity level to its maximum, the rotation switch 6004 may be operated to change the maximum light intensity to any continuous ratio of the X light intensity level within a predetermined range.

In some embodiments, a heat dissipation plate is placed between the light holder and the driver box for carrying away both heat of the driver box and the light source.

Figure 32:
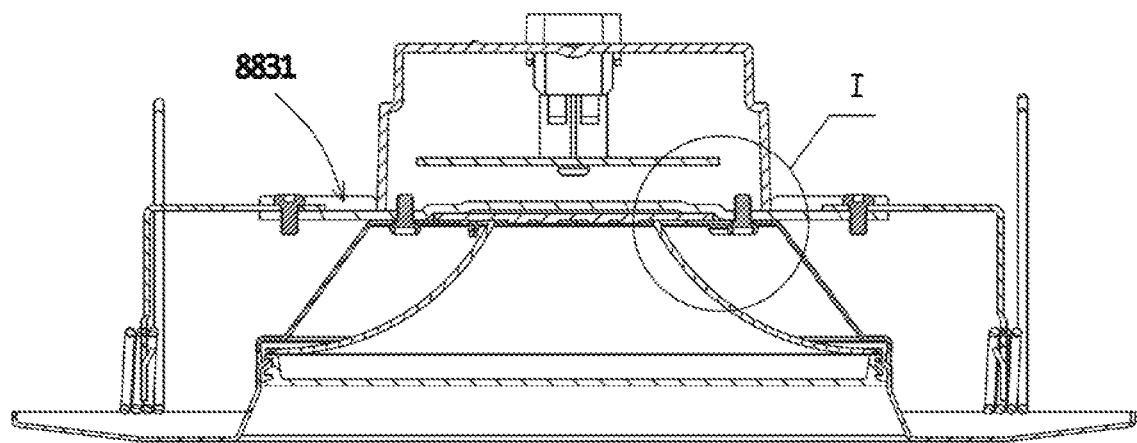
FIG. 32 illustrates a heat dissipation plate placed between a driver box and a light housing.
Figure 35:
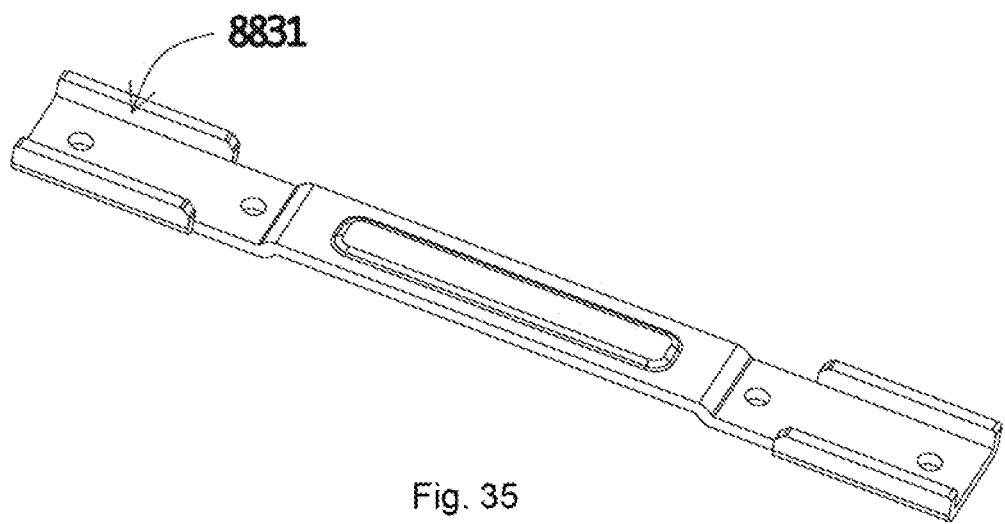
FIG. 35 illustrates a heat dissipation plate in an elongated form.

For example, FIG. 32 shows a heat dissipation plate 8831 is placed between the light holder and the driver box. FIG. 35 shows such heat dissipation plate 8831 as an elongated bar shape structure.

In some embodiments, the heat dissipation plate has a portion not covered by the light holder and the driver box. FIG. 32 and FIG. 35 shows such arrangement.

Figure 1:
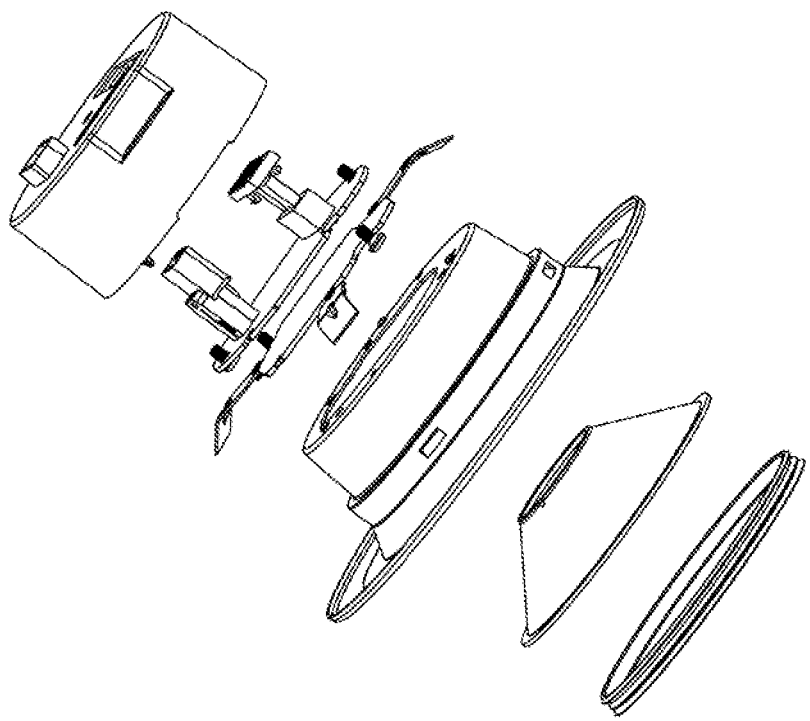
FIG. 1 illustrates an exploded view of a downlight apparatus.

FIG. 1 illustrates an exploded view of a downlight apparatus.

Figure 2:
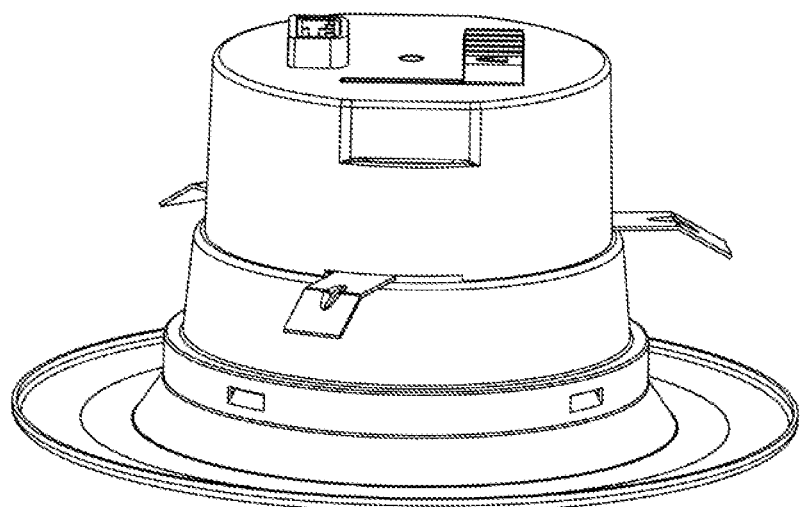
FIG. 2 illustrates a side view of the downlight apparatus of FIG. 1.

FIG. 2 illustrates a side view of the downlight apparatus of FIG. 1.

Figure 3:
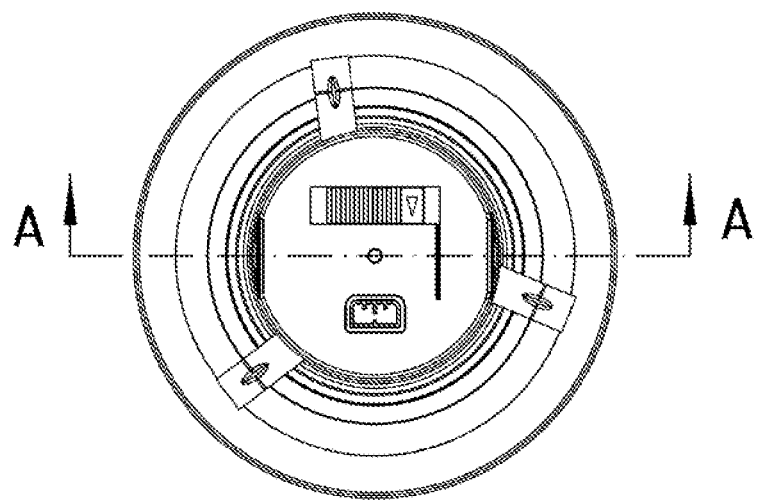
FIG. 3 illustrates a top view of the downlight apparatus of FIG. 1.

FIG. 3 illustrates a top view of the downlight apparatus of FIG. 1.

Figure 4:
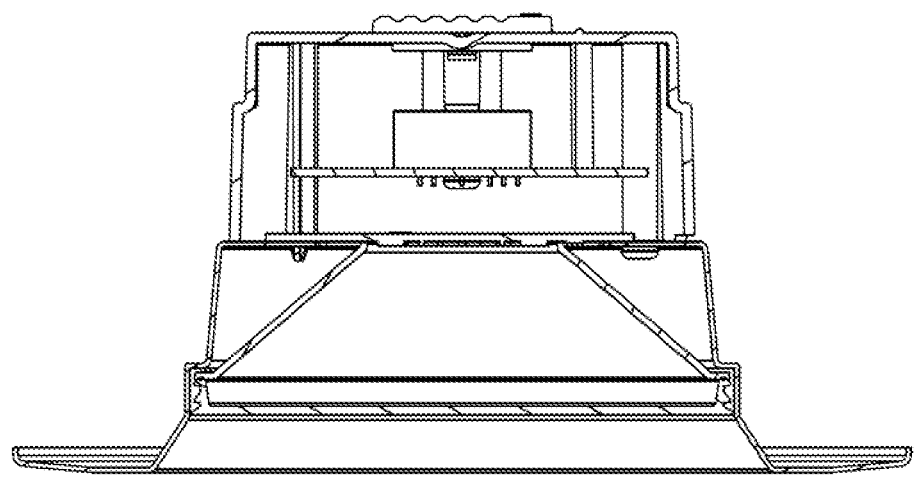
FIG. 4 illustrates a cross-sectional view of the example in FIG. 1.

FIG. 4 illustrates a cross-sectional view of the example in FIG. 1.

Figure 5:
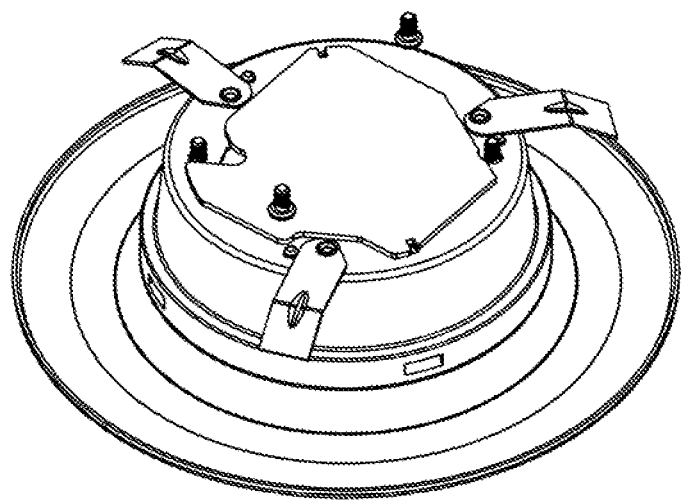
FIG. 5 illustrates a perspective view of the leaf spring and the light housing.

FIG. 5 illustrates a perspective view of the leaf spring and the light housing.

FIG. 6 illustrates a top view of the example in FIG. 5.

Figure 7:
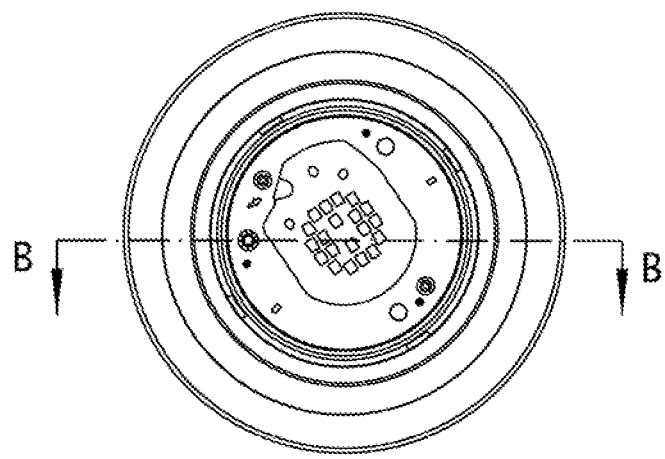
FIG. 7 illustrates a bottom view of the example in FIG. 5.

FIG. 7 illustrates a bottom view of the example in FIG. 5.

Figure 8:
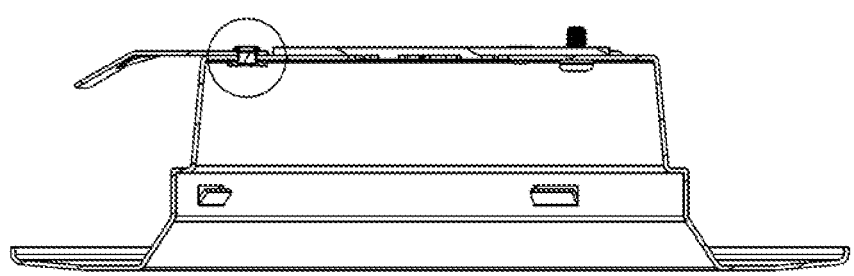
FIG. 8 illustrates a side view of the example in FIG. 5.

FIG. 8 illustrates a side view of the example in FIG. 5.

Figure 9:
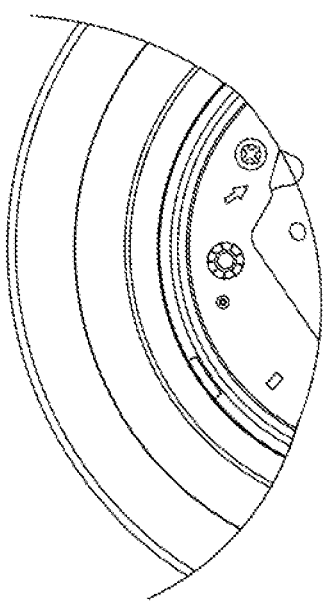
FIG. 9 illustrates a zoom-up view of a portion of the example in FIG. 5.

FIG. 9 illustrates a zoom-up view of a portion of the example in FIG. 5.

Figure 10:
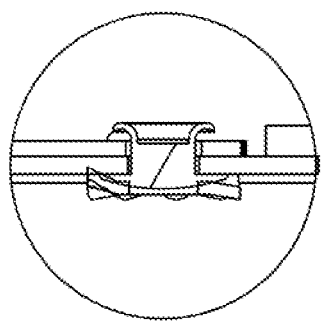
FIG. 10 illustrates a zoom-up view of a connection among multiple components.

FIG. 10 illustrates a zoom-up view of a connection among multiple components.

Figure 11:
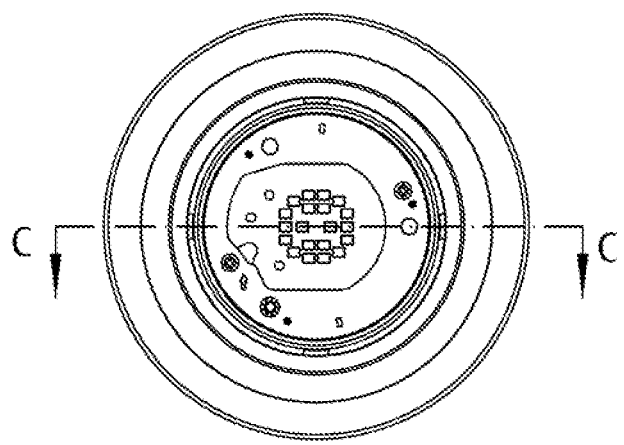
FIG. 11 illustrates another bottom view of another example.

FIG. 11 illustrates another bottom view of another example.

Figure 12:
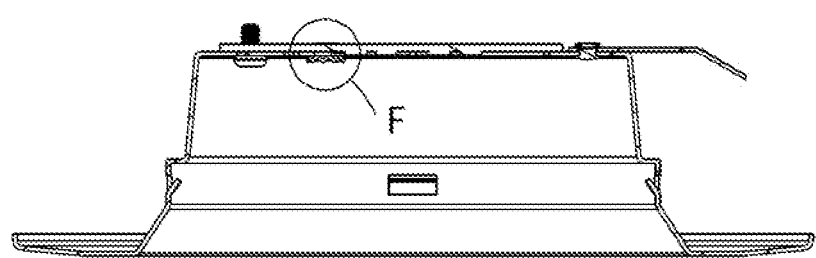
FIG. 12 illustrates a side view of another example.

FIG. 12 illustrates a side view of another example.

Figure 13:
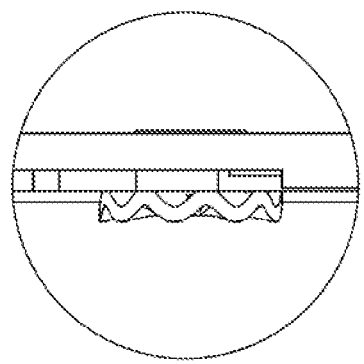
FIG. 13 illustrates a wave structure pad example.

FIG. 13 illustrates a wave structure pad example.

FIG. 14 illustrates another example of a light housing.

Figure 15:
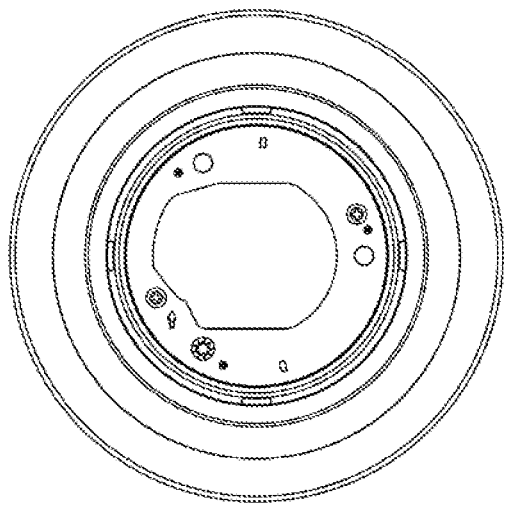
FIG. 15 illustrates a top view of the example in FIG. 14.

FIG. 15 illustrates a top view of the example in FIG. 14.

FIG. 16 illustrates an example of a wave structure pad.

Figure 17:
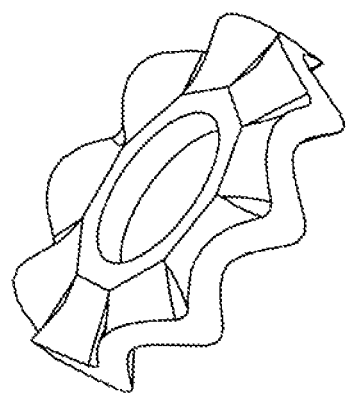
FIG. 17 illustrates another view of the example in FIG. 16.

FIG. 17 illustrates another view of the example in FIG. 16.

Figure 18:
FIG. 18 illustrates another view of the example in FIG. 16.

FIG. 18 illustrates another view of the example in FIG. 16.

Figure 19:
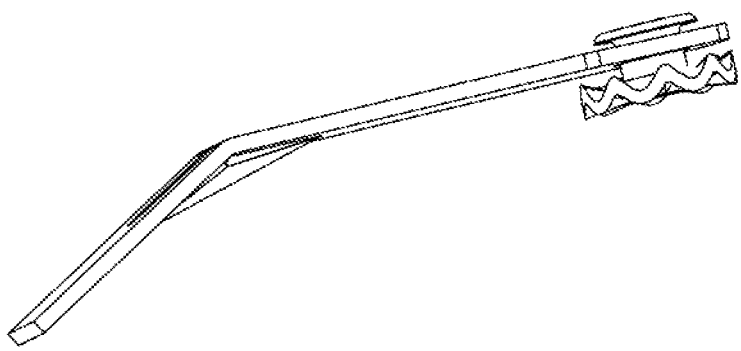
FIG. 19 illustrates a combination of the shaft connector, the leaf spring and the pad.

FIG. 19 illustrates a combination of the shaft connector, the leaf spring and the pad.

Figure 20:
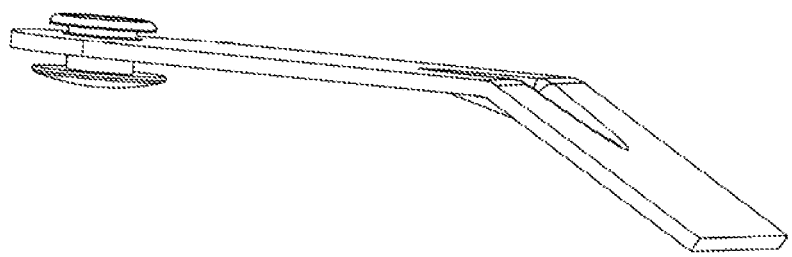
FIG. 20 illustrates another view of the example in FIG. 19.

FIG. 20 illustrates another view of the example in FIG. 19.

Figure 21:
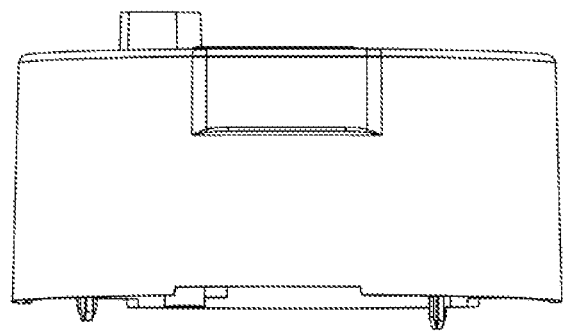
FIG. 21 illustrates a driver box example.

FIG. 21 illustrates a driver box example.

Figure 22:
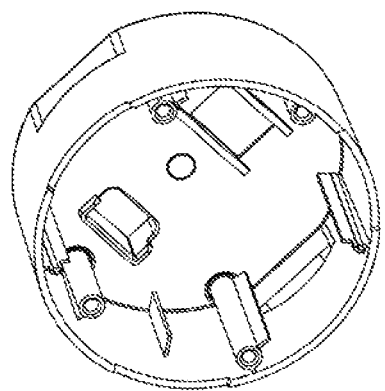
FIG. 22 illustrates another view of the example in FIG. 21.

FIG. 22 illustrates another view of the example in FIG. 21.

Figure 23:
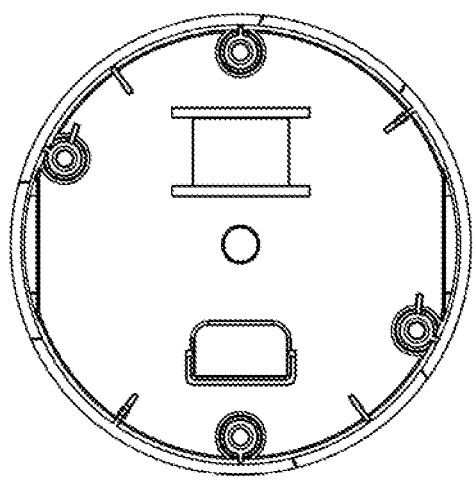
FIG. 23 illustrates another view of the example in FIG. 21.

FIG. 23 illustrates another view of the example in FIG. 21.

Figure 24:
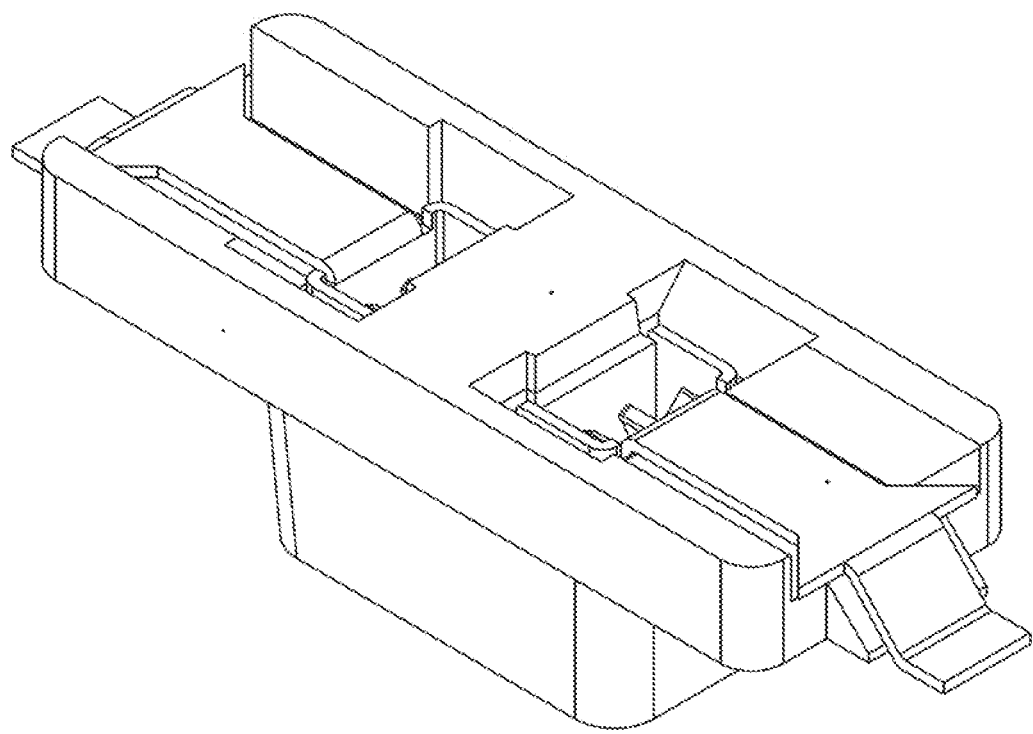
FIG. 24 illustrates a connector example.

FIG. 24 illustrates a connector example.

Figure 25:
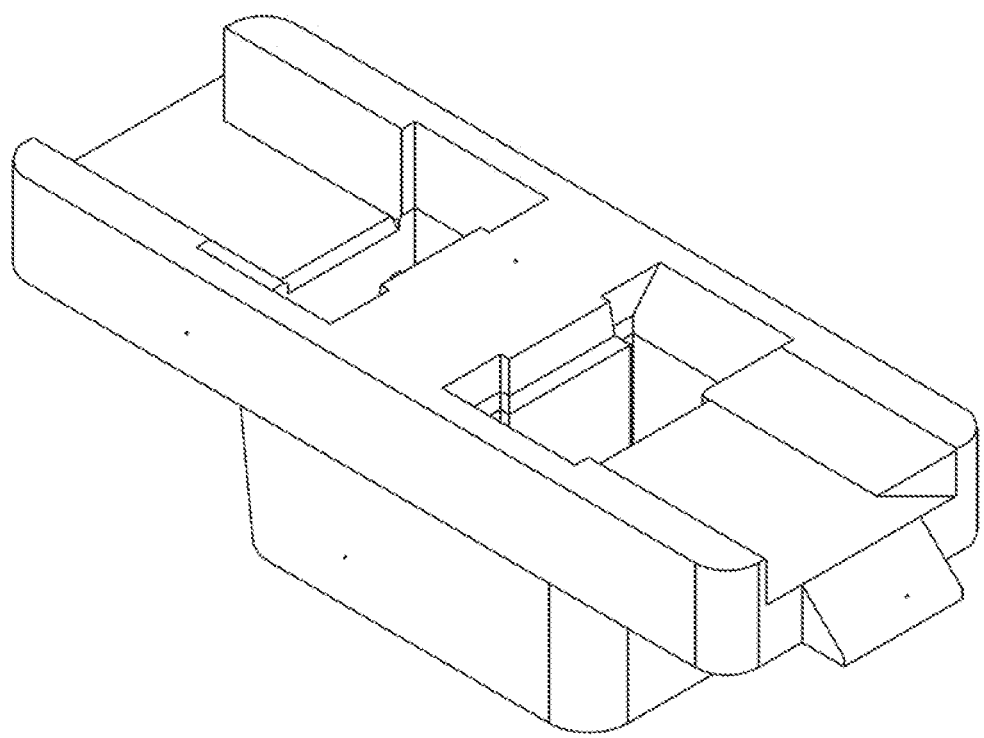
FIG. 25 illustrates a component in FIG. 24.

FIG. 25 illustrates a component in FIG. 24.

Figure 26:
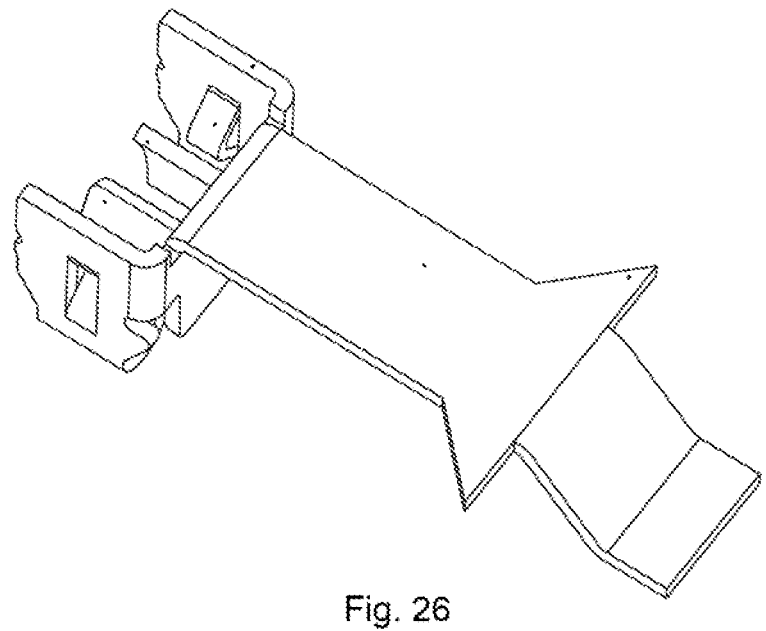
FIG. 26 illustrates another component in FIG. 24.

FIG. 26 illustrates another component in FIG. 24.

Figure 27:
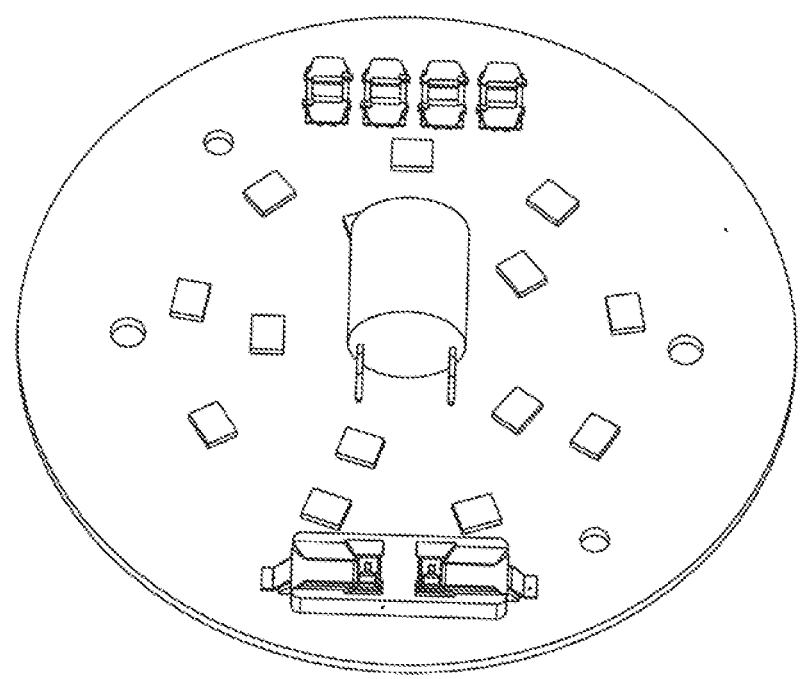
FIG. 27 illustrates the connector disposed on a light source plate.

FIG. 27 illustrates the connector disposed on a light source plate.

Figure 28:
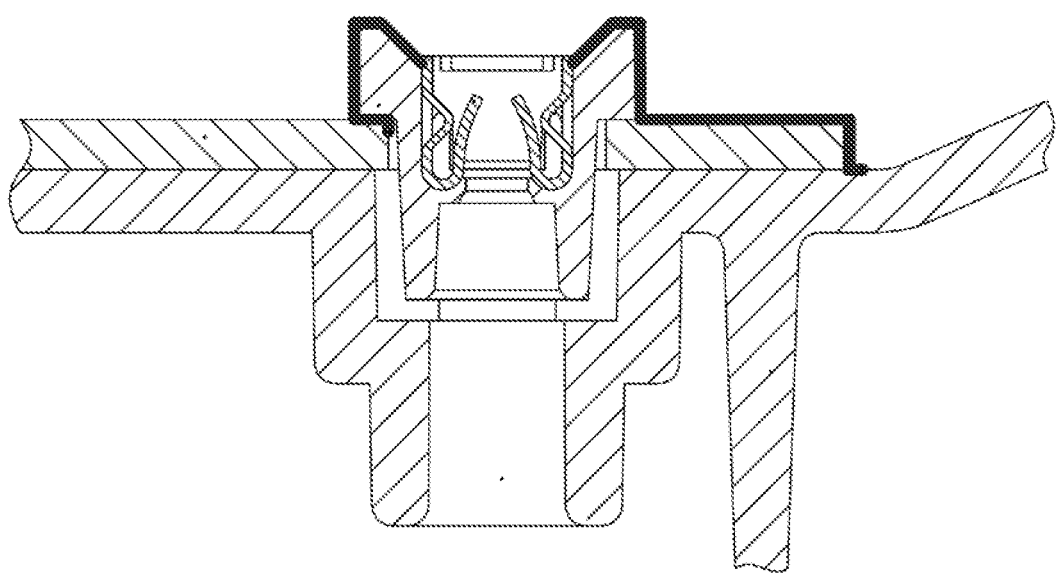
FIG. 28 illustrates an electricity distance diagram.

FIG. 28 illustrates an electricity distance diagram.

Figure 29:
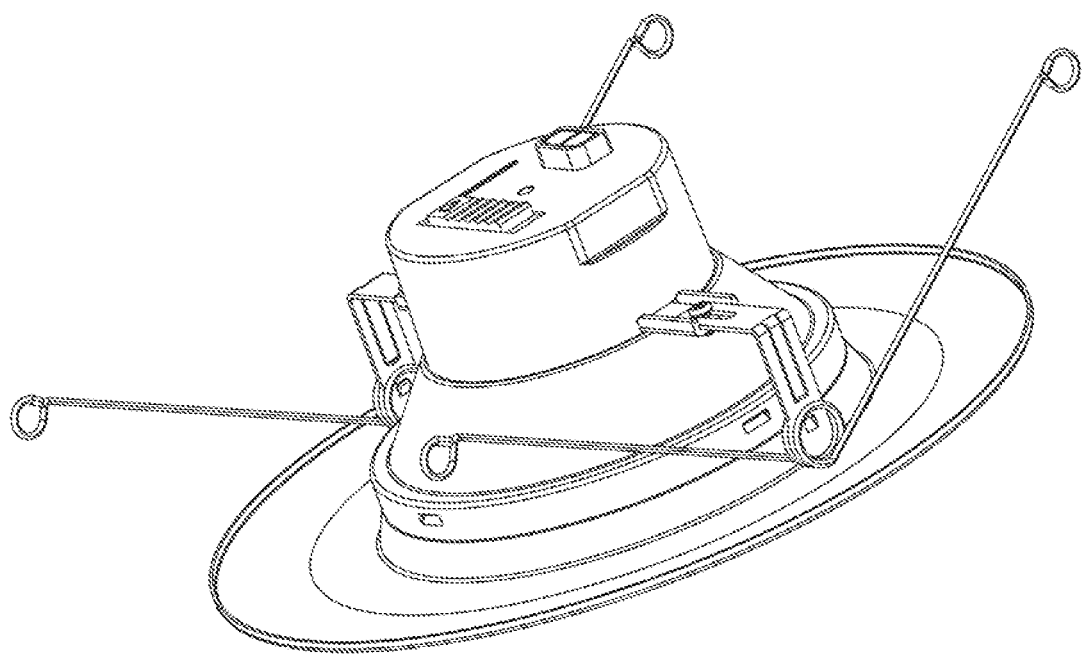
FIG. 29 illustrates another downlight example.

FIG. 29 illustrates another downlight example.

Figure 30:
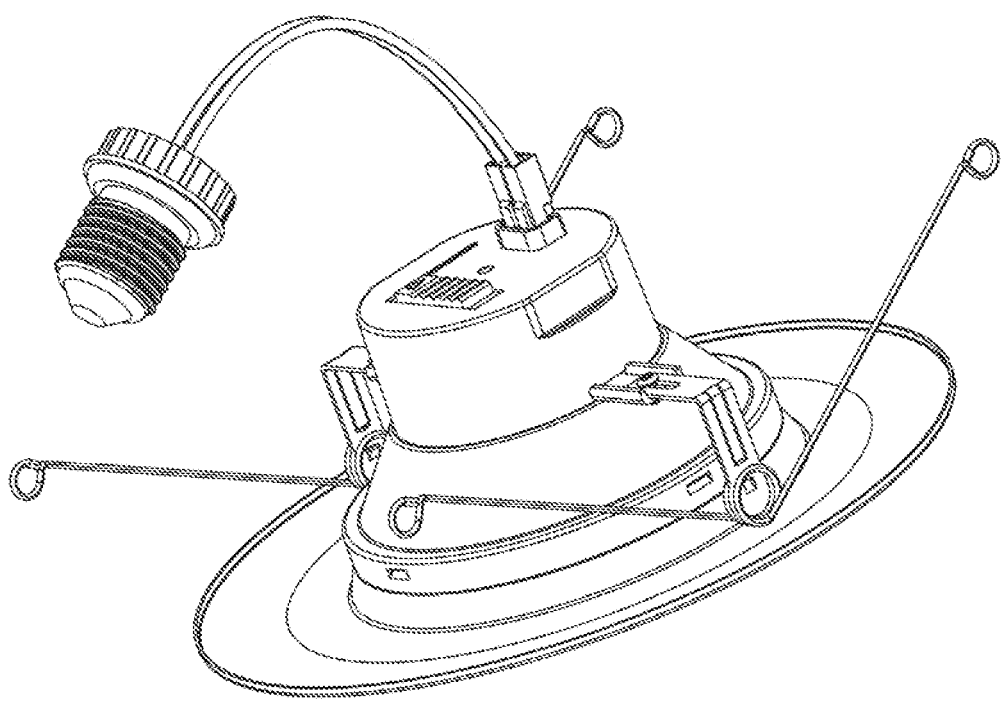
FIG. 30 illustrates the example in FIG. 29 with a wire connector.

FIG. 30 illustrates the example in FIG. 29 with a wire connector.

Figure 31:
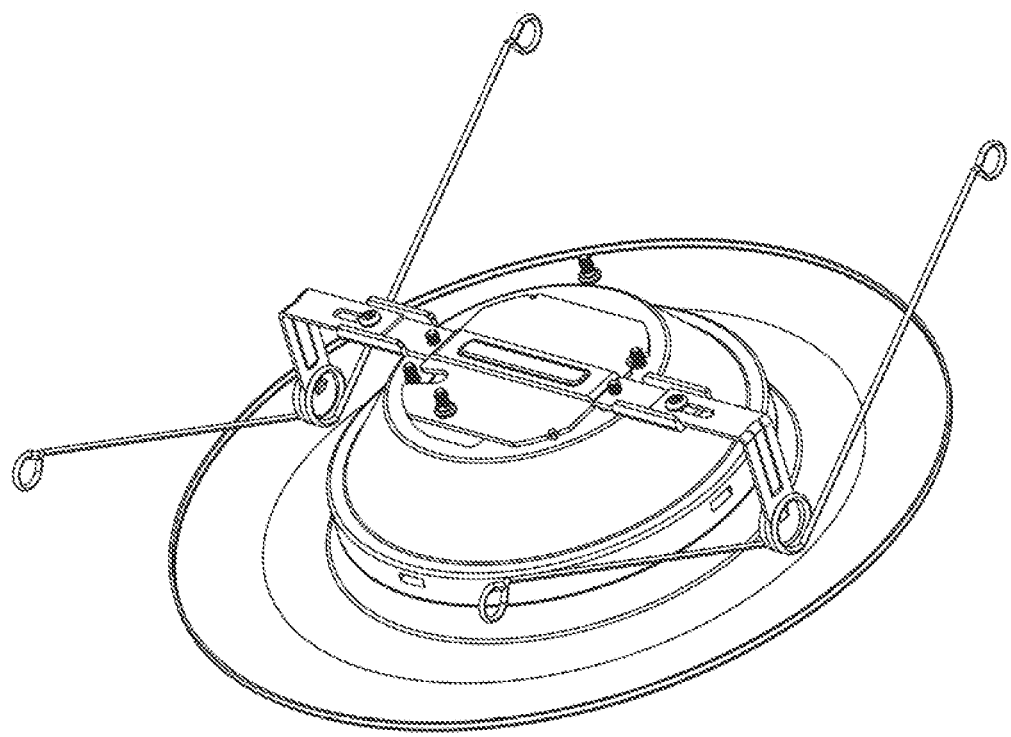
FIG. 31 illustrates a fixing bar placed on a light housing.

FIG. 31 illustrates a fixing bar placed on a light housing.

FIG. 32 illustrates a heat dissipation plate placed between a driver box and a light housing.

Figure 33:
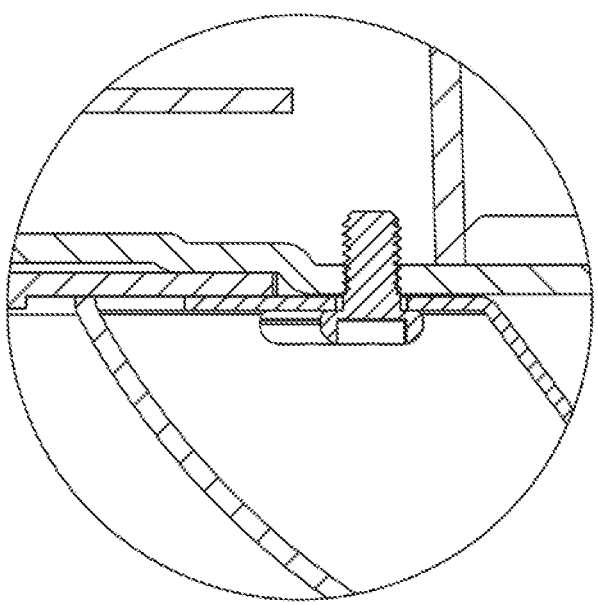
FIG. 33 illustrates a screw for transmitting heat.

FIG. 33 illustrates a screw for transmitting heat.

Figure 34:
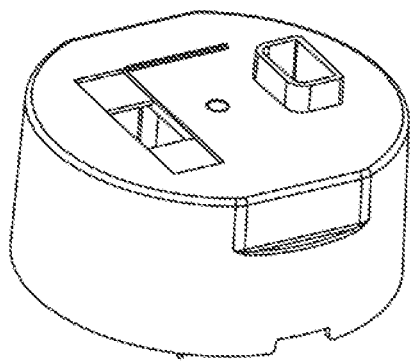
FIG. 34 illustrates a driver box example.

FIG. 34 illustrates a driver box example.

FIG. 35 illustrates a heat dissipation plate in an elongated form.

Figure 36:
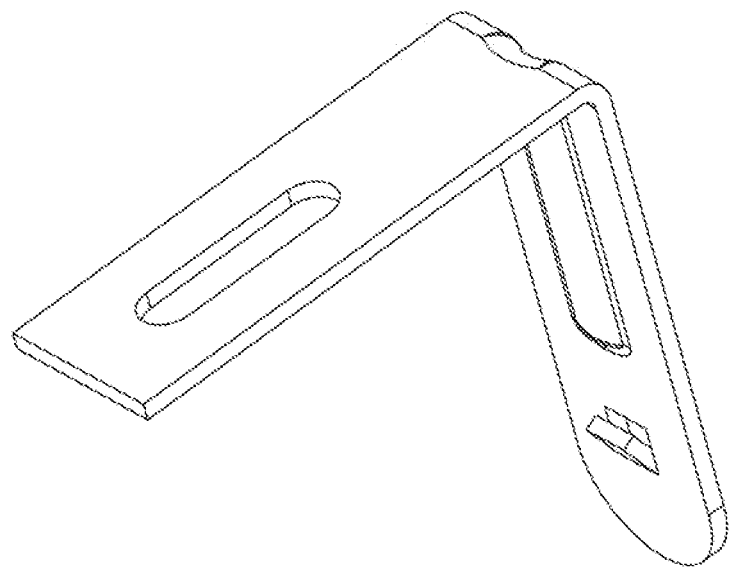
FIG. 36 illustrates a connector for connecting components.

FIG. 36 illustrates a connector for connecting components.

Figure 37:
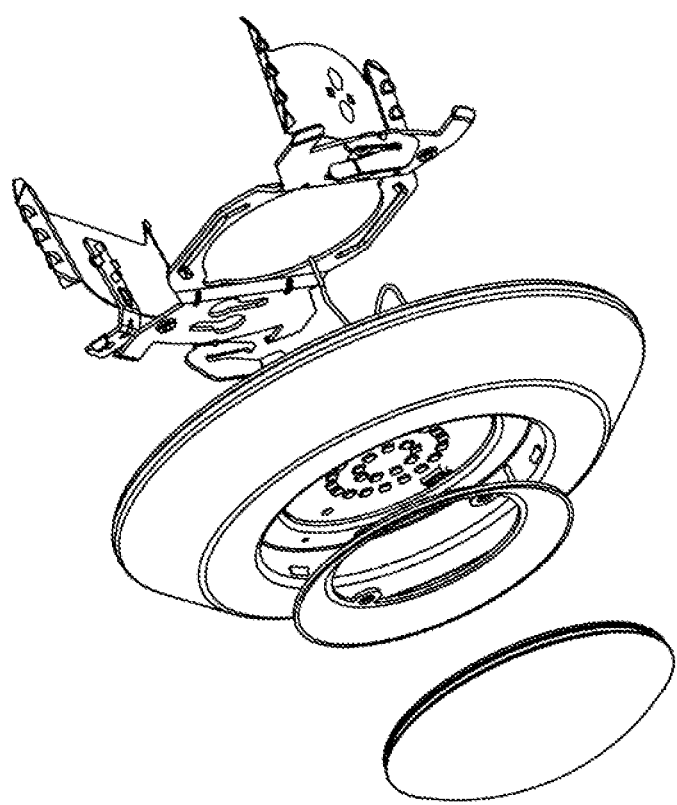
FIG. 37 illustrates an exploded view of another downlight embodiment.

FIG. 37 illustrates an exploded view of another downlight embodiment.

Figure 38:
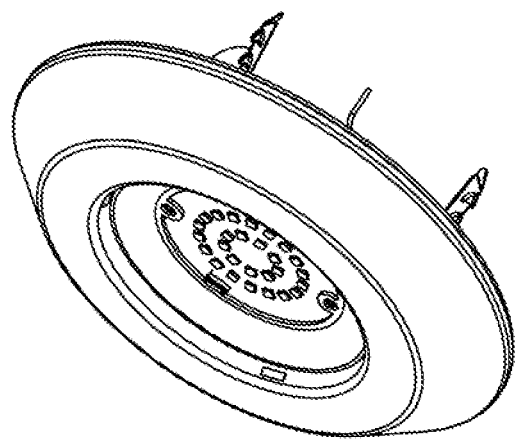
FIG. 38 illustrates a component in the example of FIG. 37.

FIG. 38 illustrates a component in the example of FIG. 37.

Figure 39:
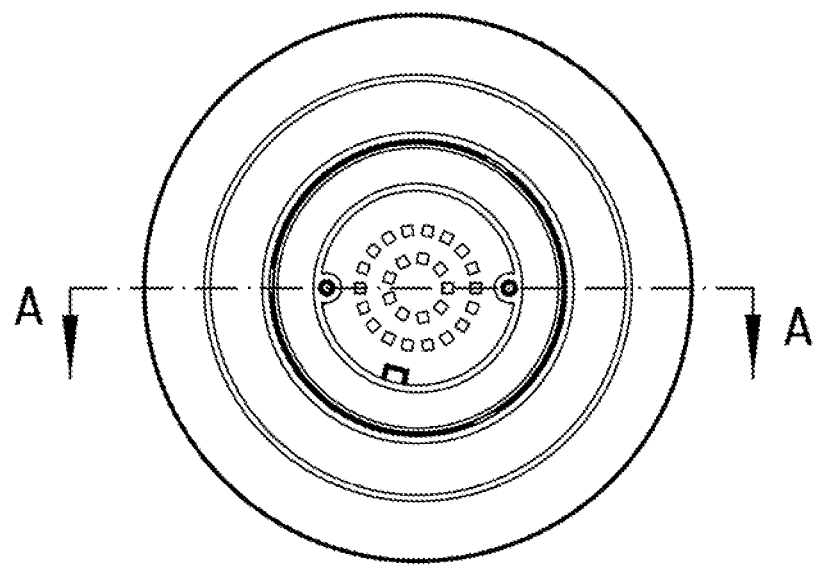
FIG. 39 illustrates a bottom view of the example in FIG. 37.

FIG. 39 illustrates a bottom view of the example in FIG. 37.

Figure 40:
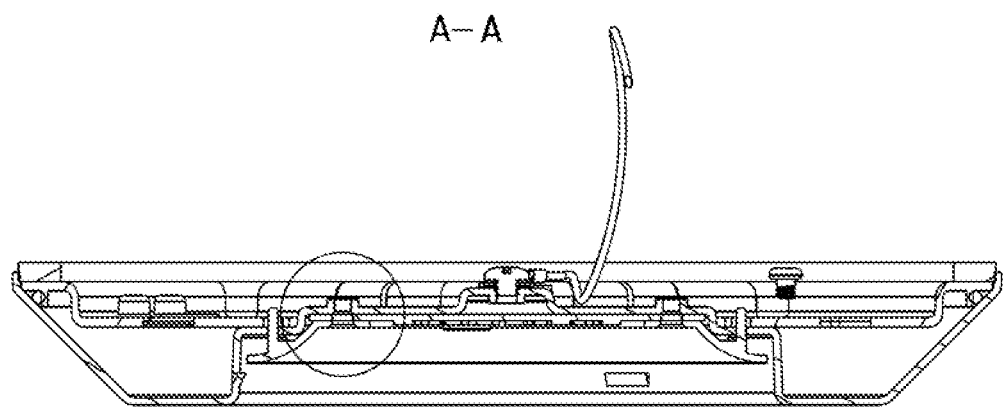
FIG. 40 illustrates another example in a cross-sectional view.

FIG. 40 illustrates another example in a cross-sectional view.

Figure 41:
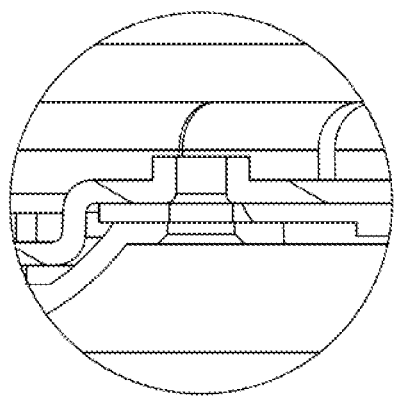
FIG. 41 illustrates a zoom-up view of a connection between components.

FIG. 41 illustrates a zoom-up view of a connection between components.

Figure 42:
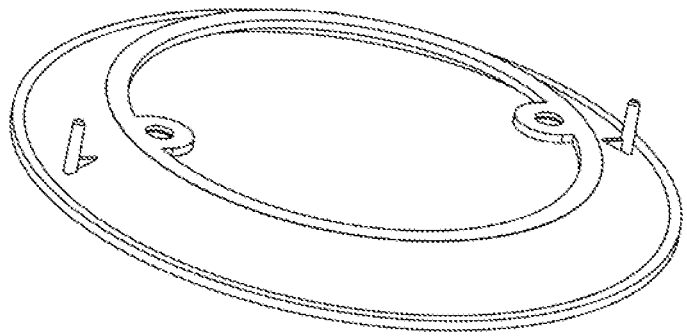
FIG. 42 illustrates a reflective cup example.

FIG. 42 illustrates a reflective cup example.

Figure 43:
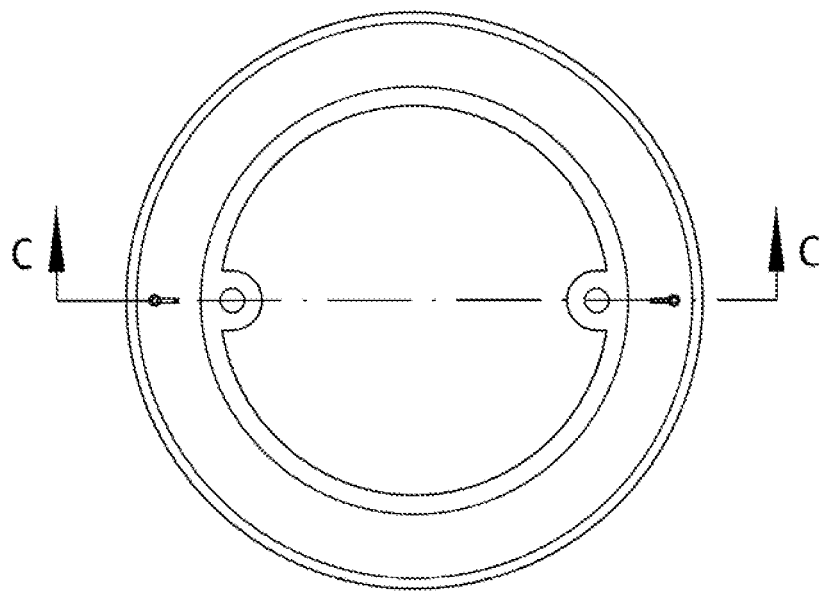
FIG. 43 illustrates a top view of the example in FIG. 42.

FIG. 43 illustrates a top view of the example in FIG. 42.

Figure 44:
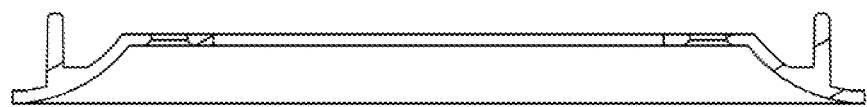
FIG. 44 illustrates a side view of the example in FIG. 42.

FIG. 44 illustrates a side view of the example in FIG. 42.

Figure 45:
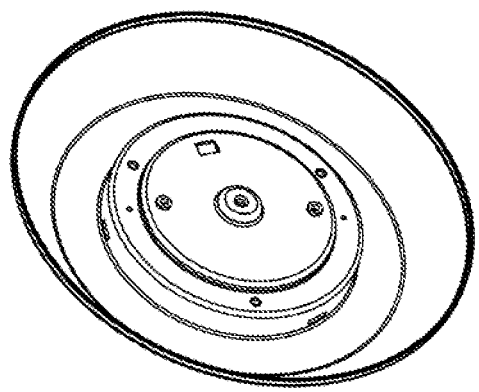
FIG. 45 illustrates a top view of a light housing.

FIG. 45 illustrates a top view of a light housing.

Figure 46:
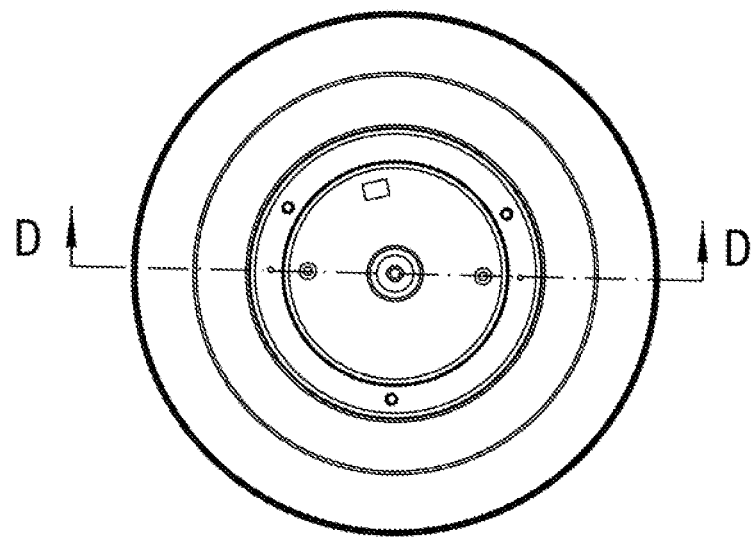
FIG. 46 illustrates another top view of the light housing example in FIG. 45.

FIG. 46 illustrates another top view of the light housing example in FIG. 45.

Figure 47:
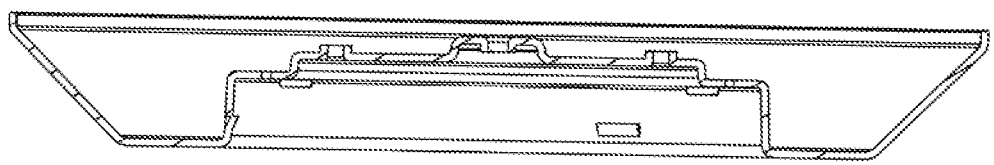
FIG. 47 illustrates a cross-sectional view of the example in FIG. 46.

FIG. 47 illustrates a cross-sectional view of the example in FIG. 46.

Figure 48:
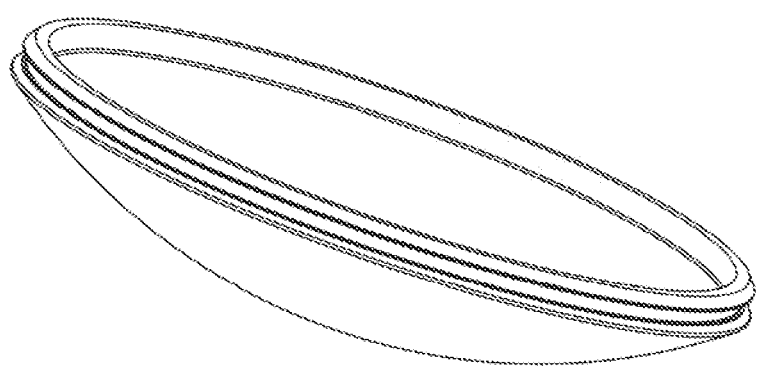
FIG. 48 illustrates a diffusion cover.

FIG. 48 illustrates a diffusion cover.

Figure 49:
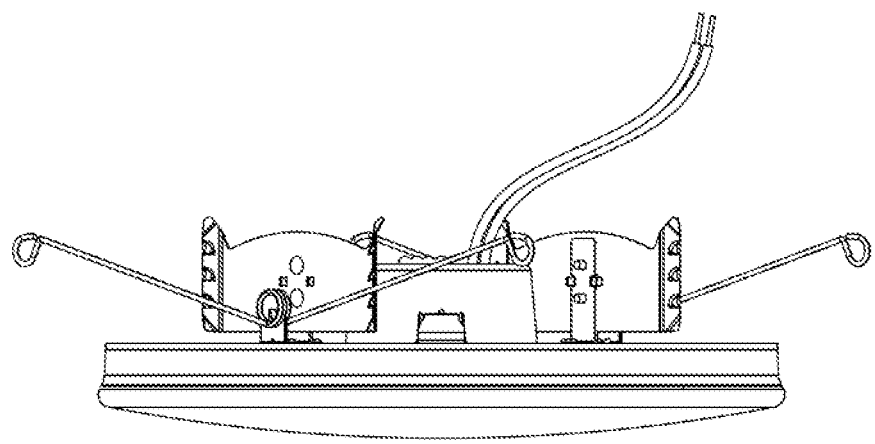
FIG. 49 illustrates a side view of a downlight example.

FIG. 49 illustrates a side view of a downlight example.

Figure 50:
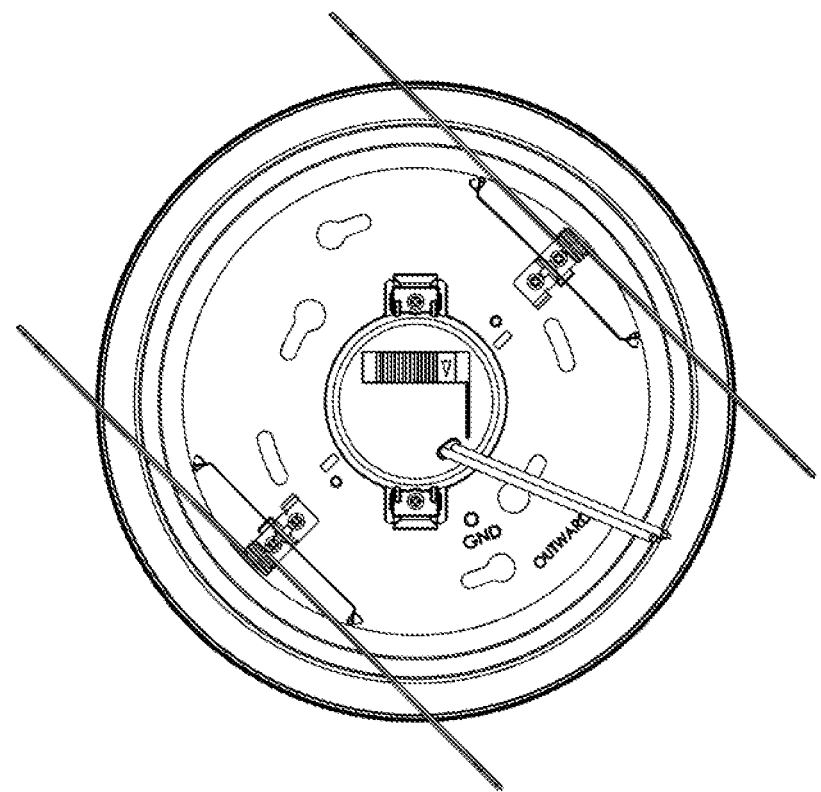
FIG. 50 illustrates a top view of the example in FIG. 49.

FIG. 50 illustrates a top view of the example in FIG. 49.

Figure 51:
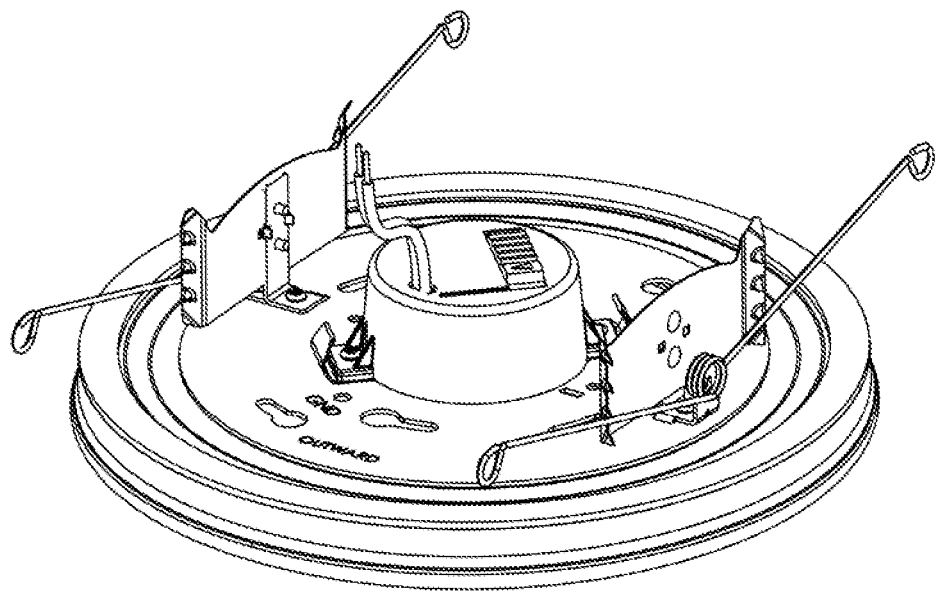
FIG. 51 illustrates another view of the example in FIG. 50.

FIG. 51 illustrates another view of the example in FIG. 50.

Figure 52:
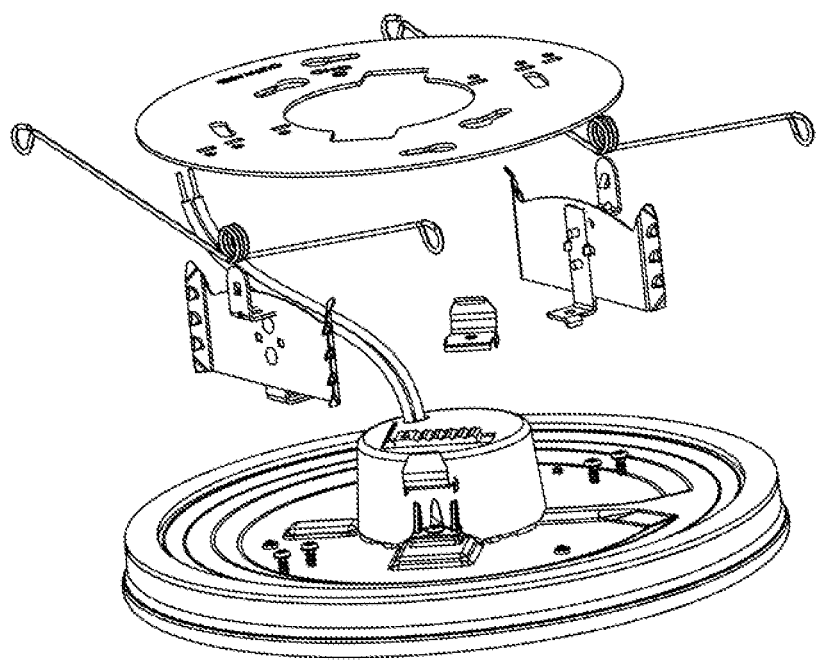
FIG. 52 illustrates an exploded view of the example in FIG. 51.

FIG. 52 illustrates an exploded view of the example in FIG. 51.

Figure 53:
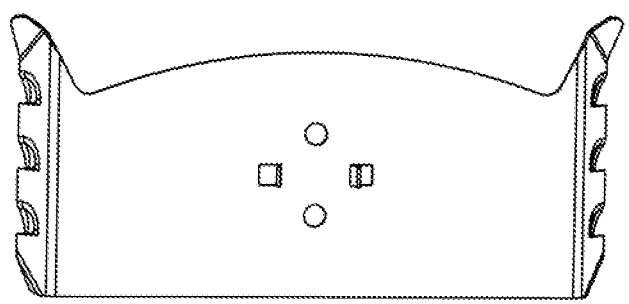
FIG. 53 illustrates an elastic plate example.

FIG. 53 illustrates an elastic plate example.

Figure 54:
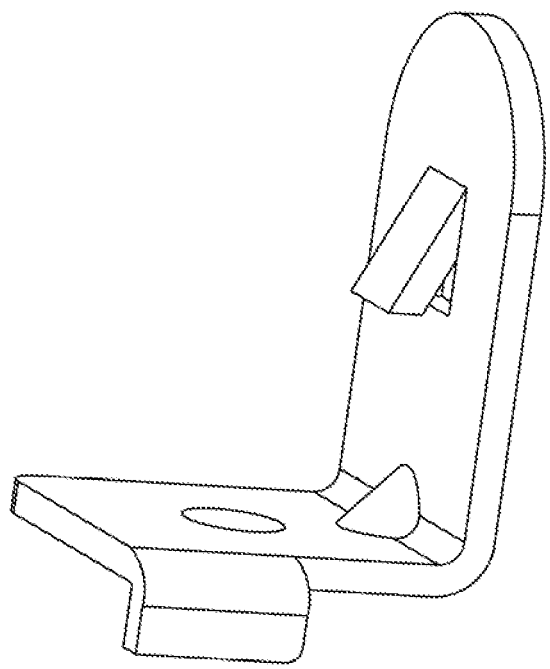
FIG. 54 illustrates a connector example.

FIG. 54 illustrates a connector example.

Figure 55:
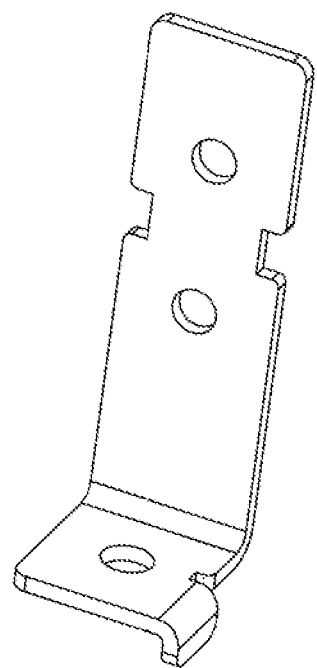
FIG. 55 illustrates another connector example.

FIG. 55 illustrates another connector example.

Figure 56:
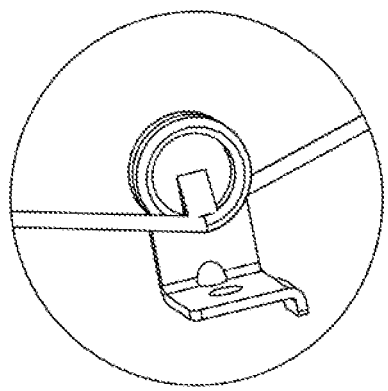
FIG. 56 illustrates a torsion spring zoom-up view.
Figure 57:
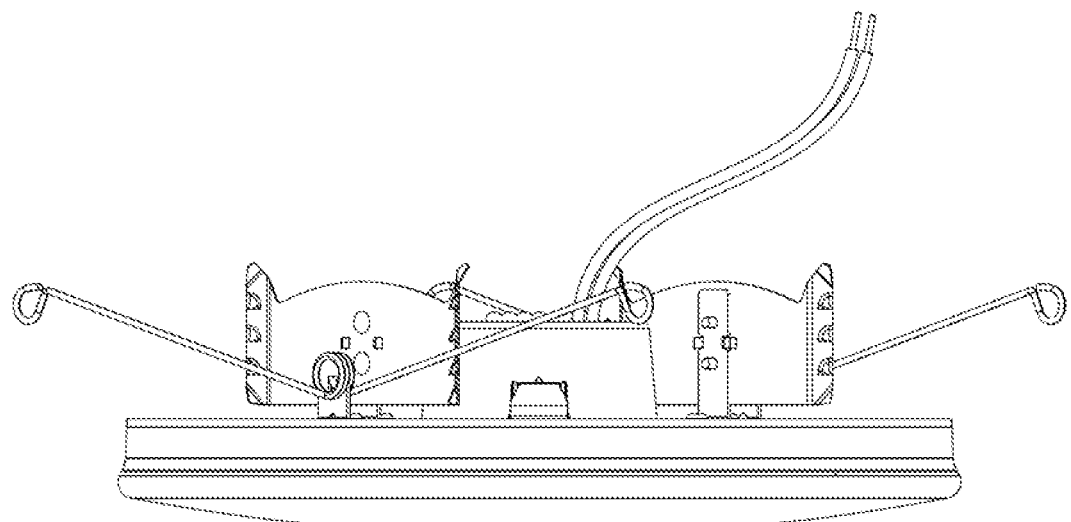
FIG. 57 illustrates another downlight example.
Figure 58:
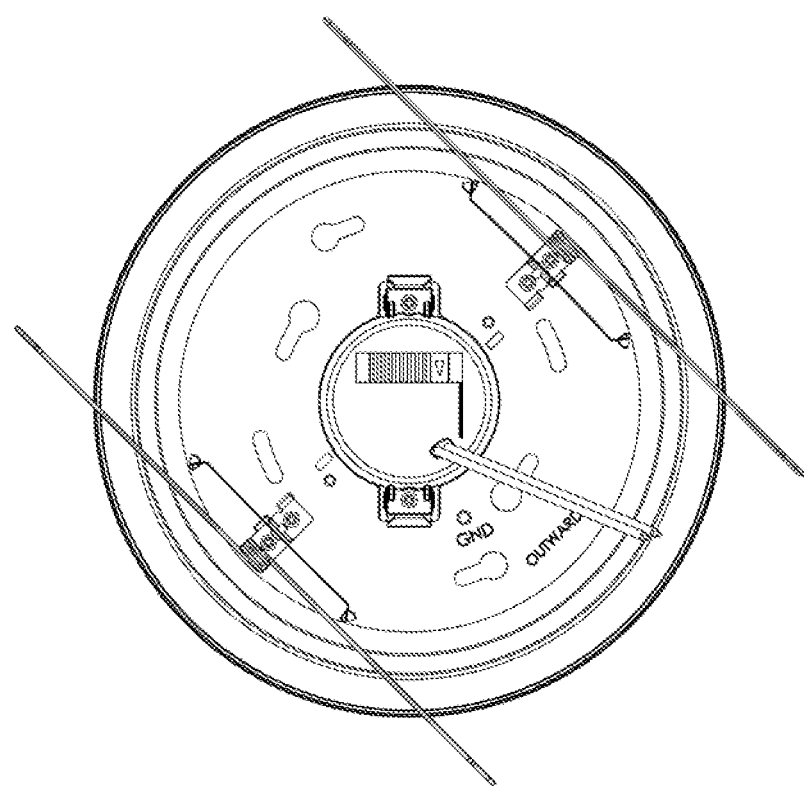
FIG. 58 illustrates a top view of the example in FIG. 57.
Figure 59:
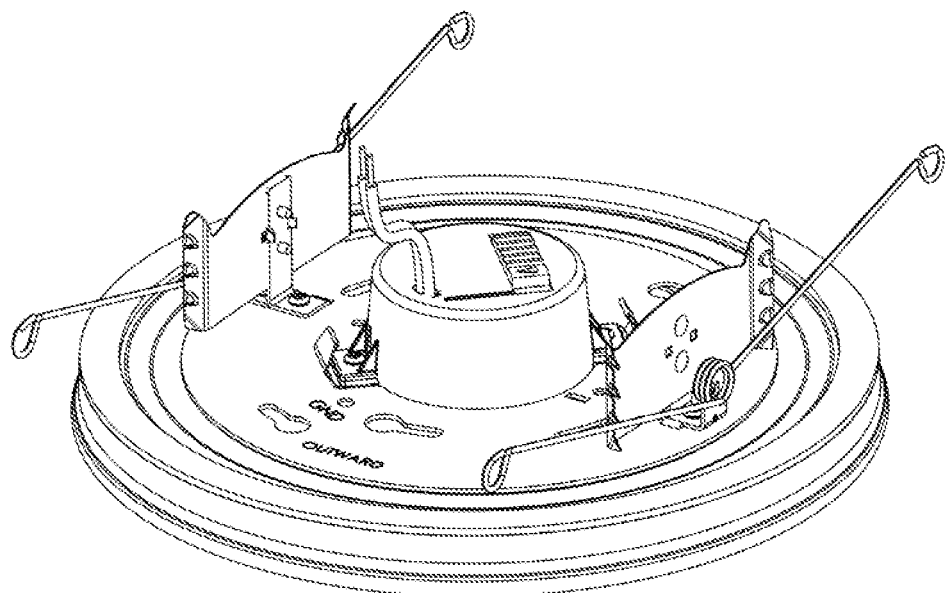
FIG. 59 illustrates another view of the example in FIG. 58.
Figure 60:
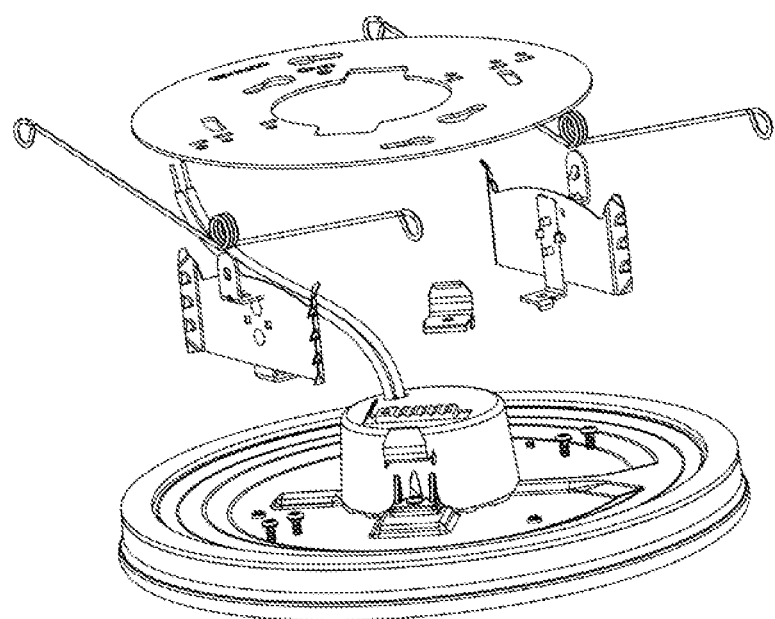
FIG. 60 illustrates an exploded view of the example in FIG. 59.
Figure 61:
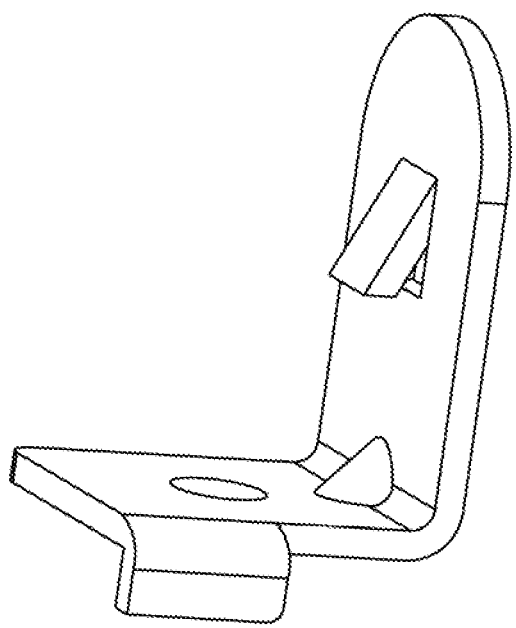
FIG. 61 illustrates a connector example.
Figure 62:
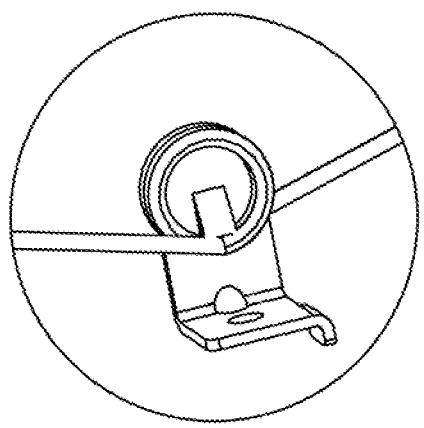
FIG. 62 illustrates a torsion spring zoom-up view.
Figure 63:
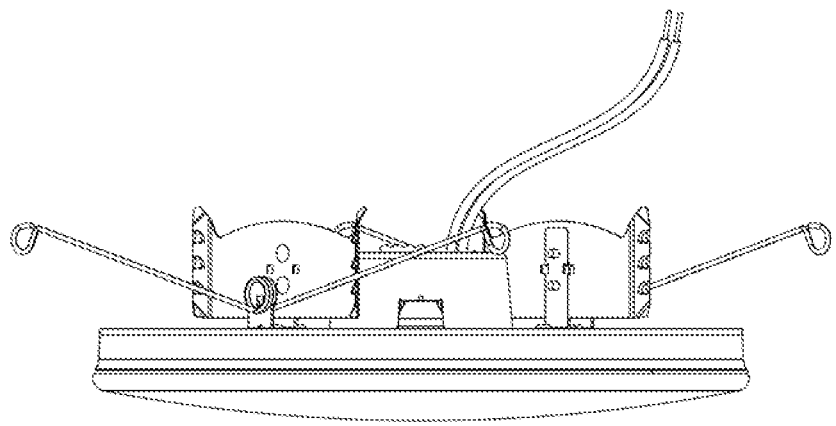
FIG. 63 illustrates another downlight example.
Figure 64:
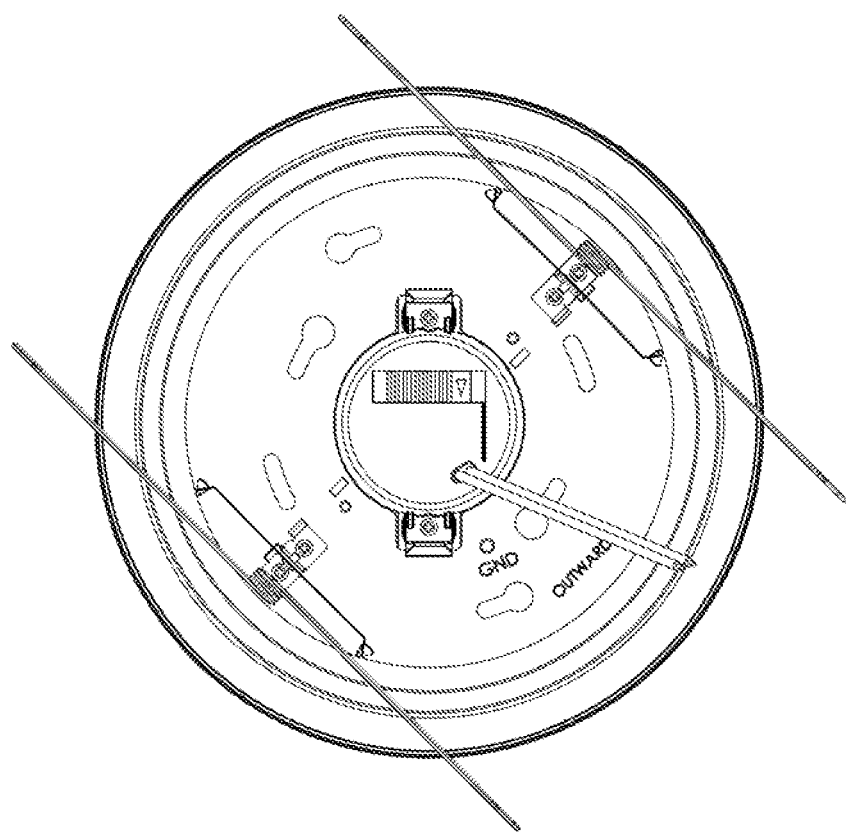
FIG. 64 illustrates a top view of the example in FIG. 63.
Figure 65:
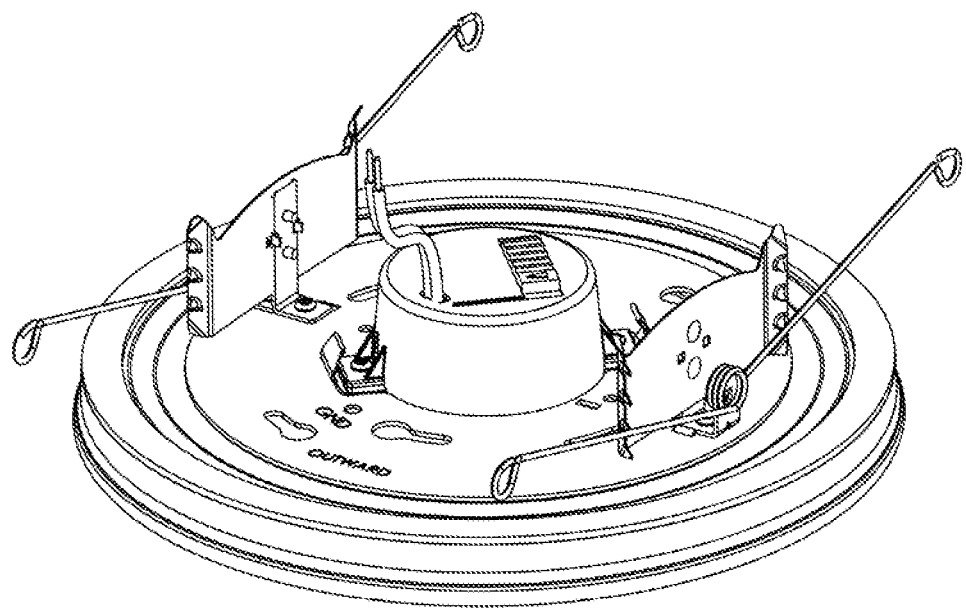
FIG. 65 illustrates another view of the example in FIG. 64.
Figure 66:
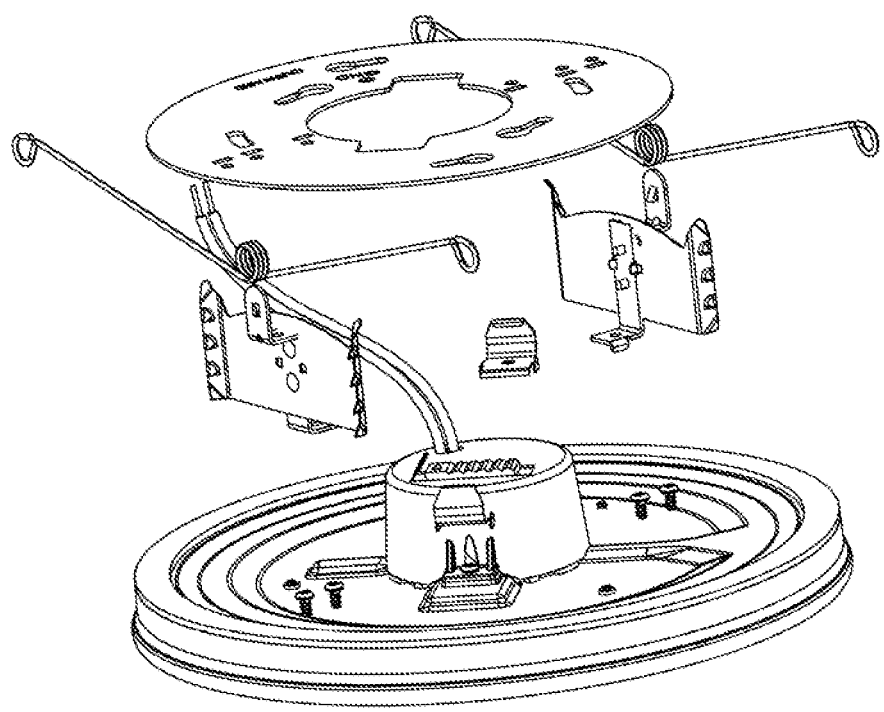
FIG. 66 illustrates an exploded view of the example in FIG. 65.
Figure 67:
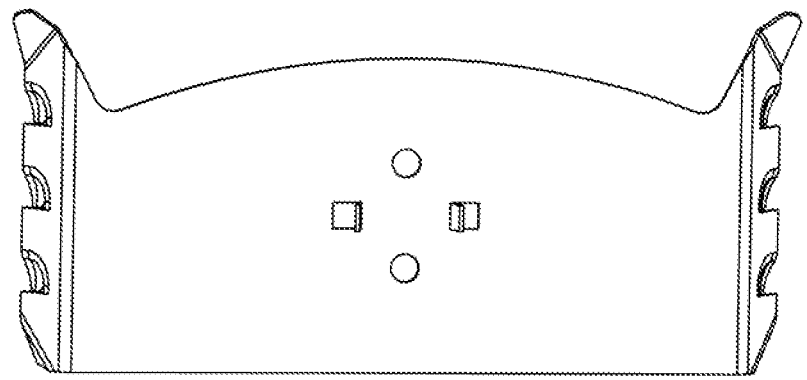
FIG. 67 illustrates an elastic plate example.
Figure 68:
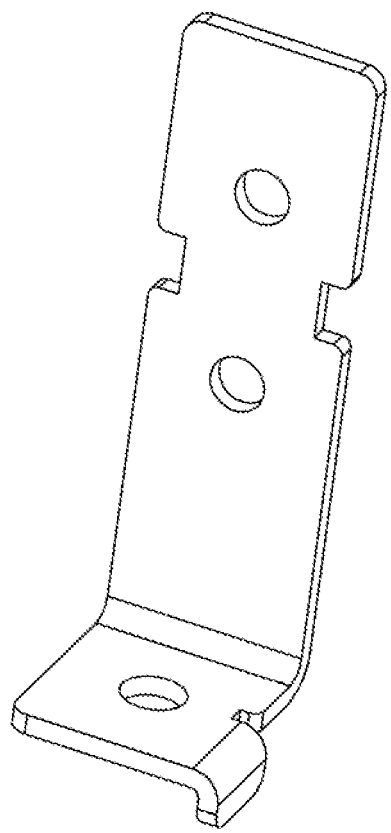
FIG. 68 illustrates a connector example.
Figure 69:
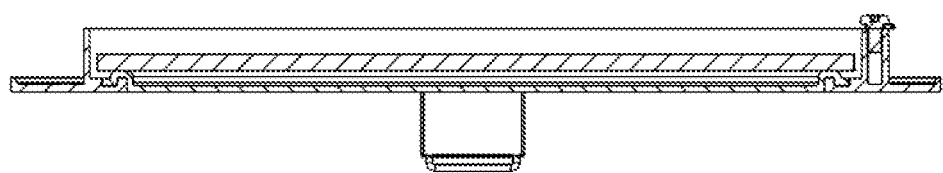
FIG. 69 illustrates a side view of a diffusion cover and related components.
Figure 70:
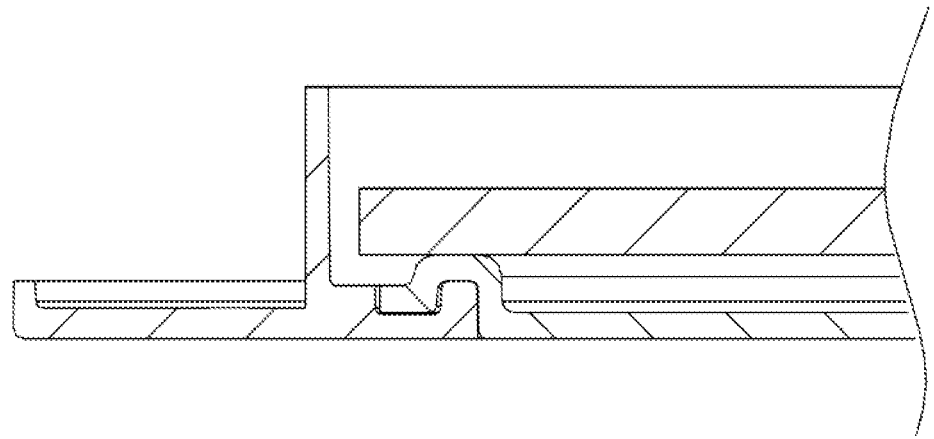
FIG. 70 illustrates a zoom-up view of the diffusion cover and related components.
Figure 71:
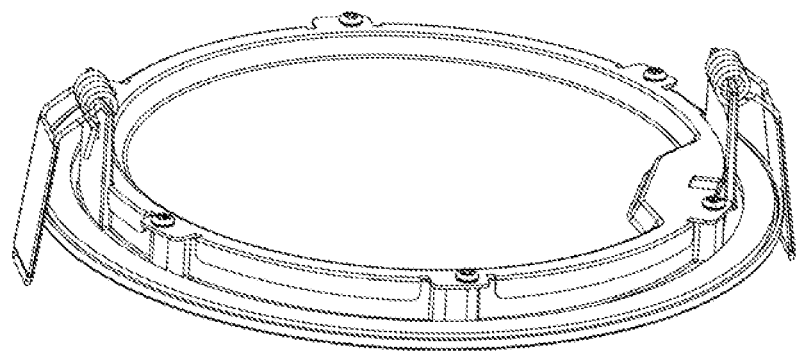
FIG. 71 illustrates a rim part example.
Figure 72:
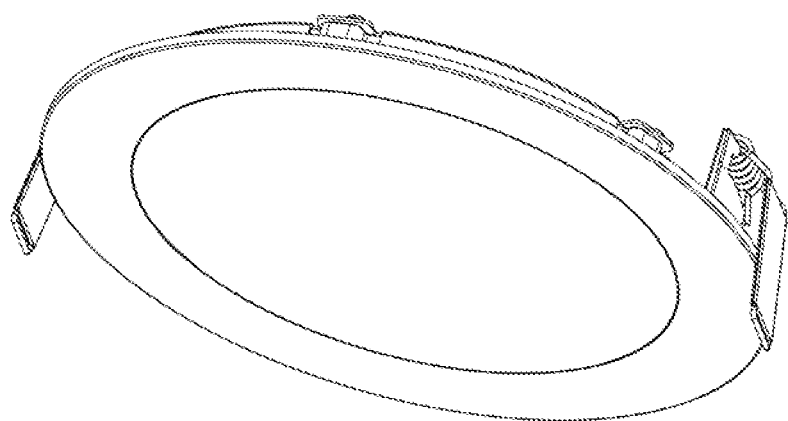
FIG. 72 illustrates another view of the example in FIG. 71.
Figure 73:
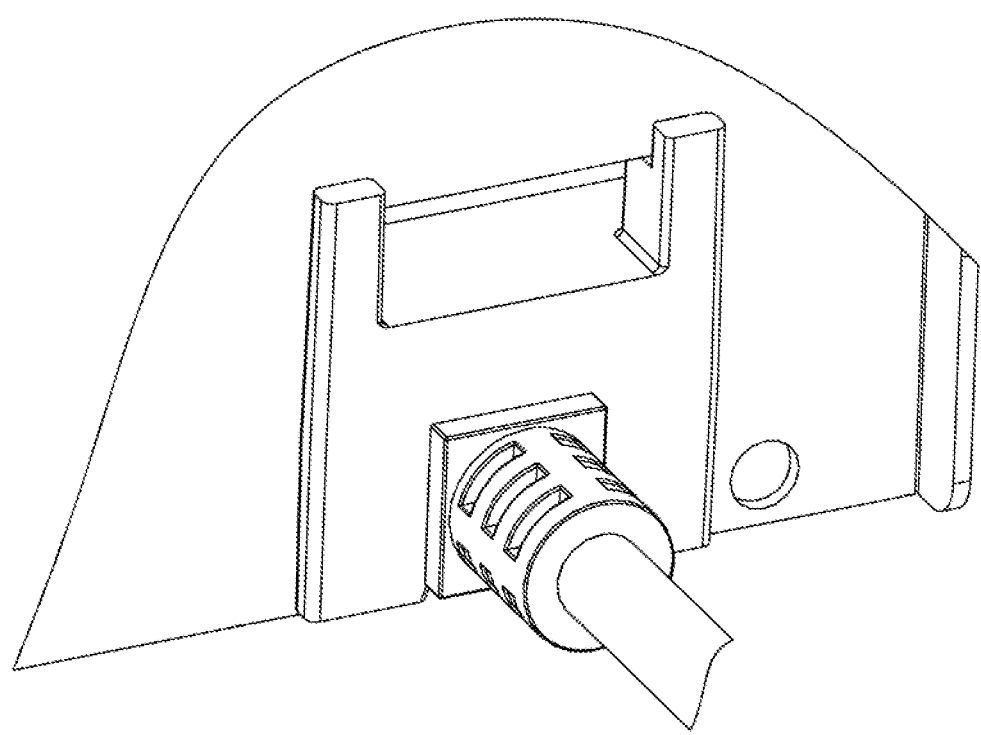
FIG. 73 illustrates a wiring unit example.
Figure 74:
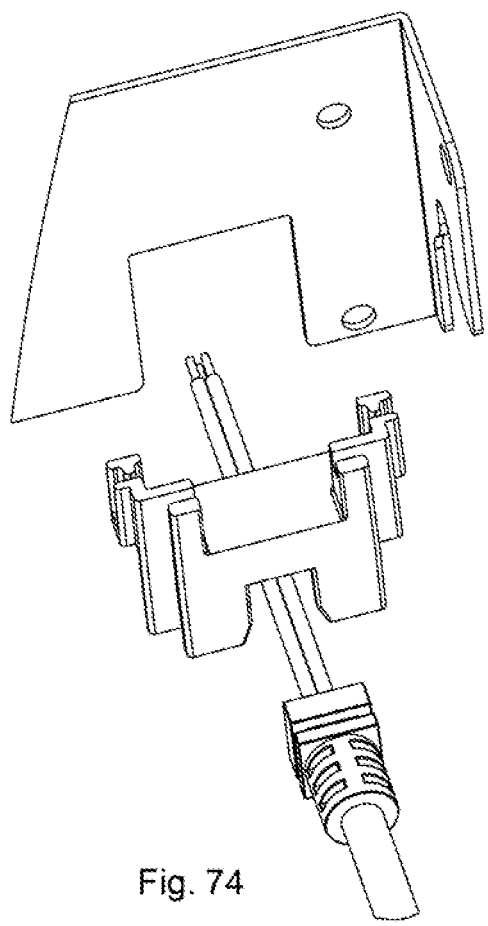
FIG. 74 illustrates an exploded view of the example in FIG. 73.
Figure 75:
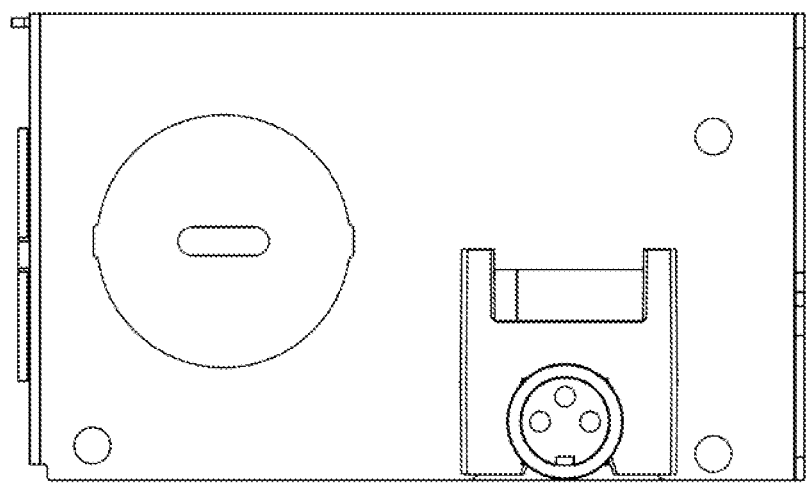
FIG. 75 illustrates a driver box with the wiring unit.
Figure 76:
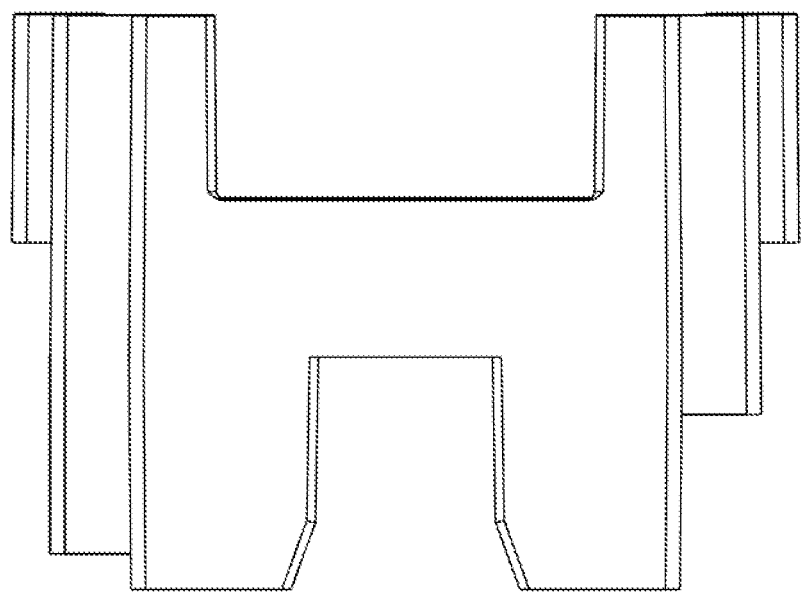
FIG. 76 illustrates a side view of the wiring unit.
Figure 77:
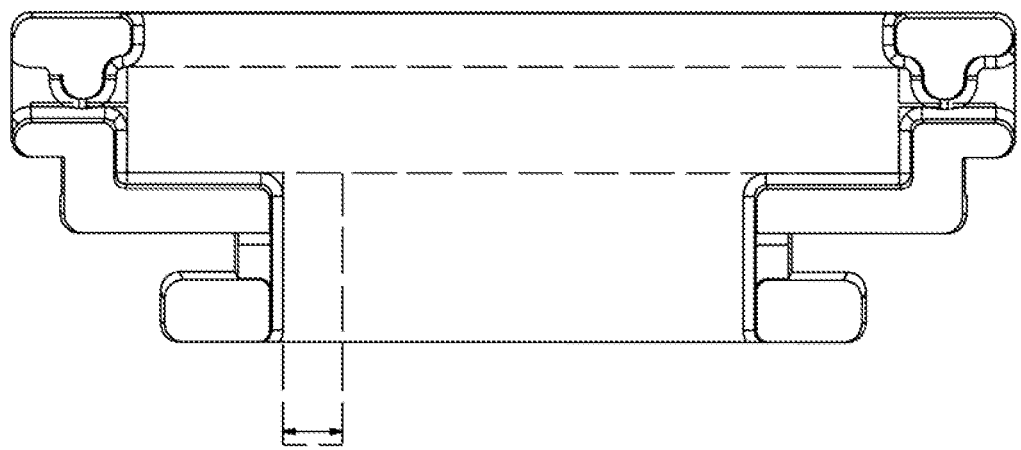
FIG. 77 illustrates another view of the wiring unit.
Figure 78:
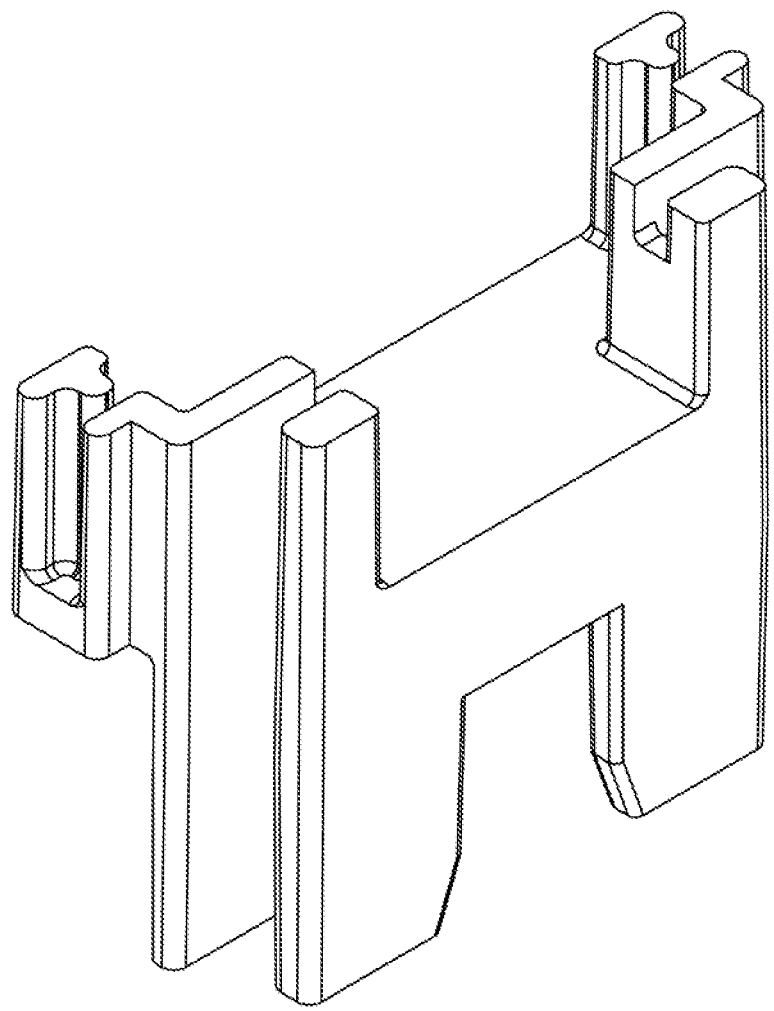
FIG. 78 illustrates another view of the wiring unit.
Figure 79:
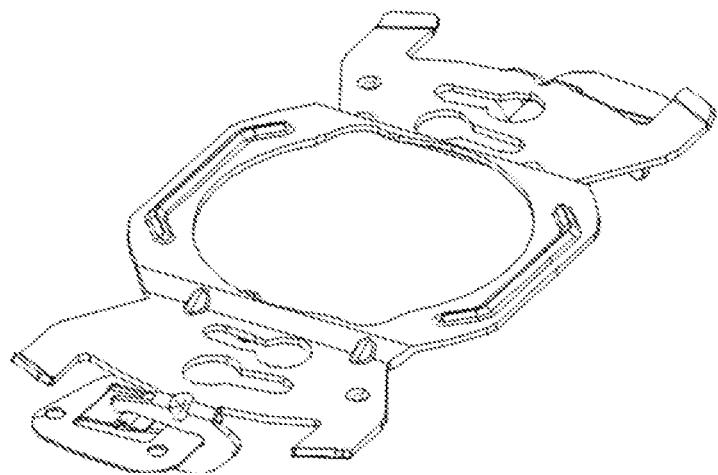
FIG. 79 illustrates a fixing bracket example.
Figure 80:
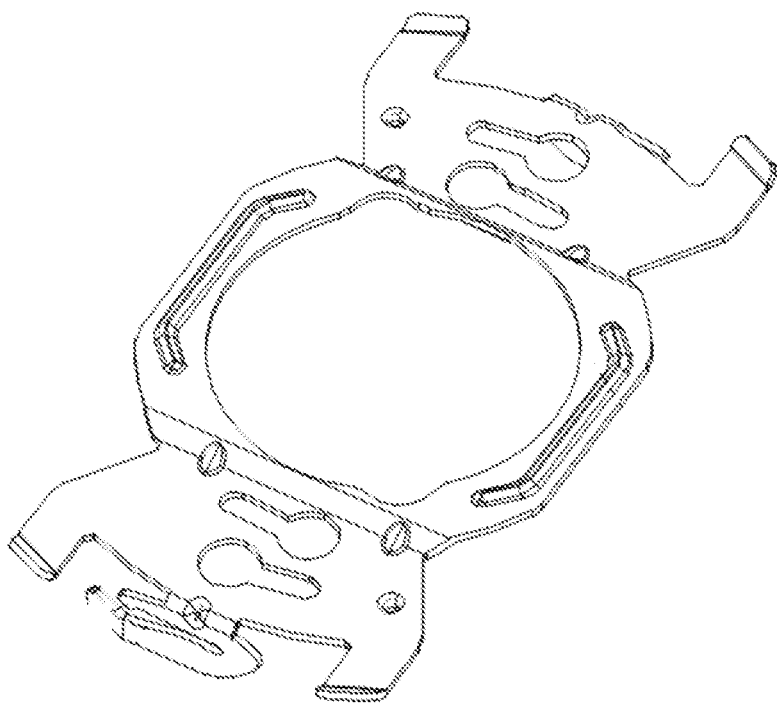
FIG. 80 illustrates another fixing bracket example.
Figure 81:
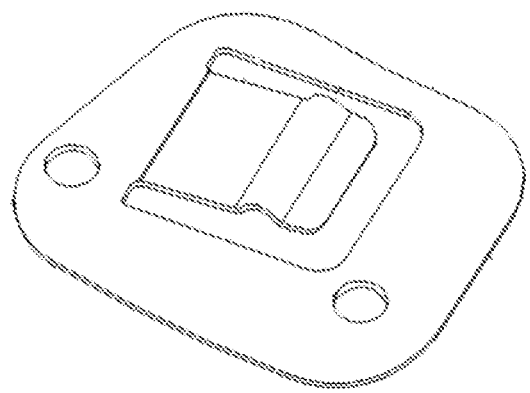
FIG. 81 illustrates an elastic stop unit example.
Figure 82:
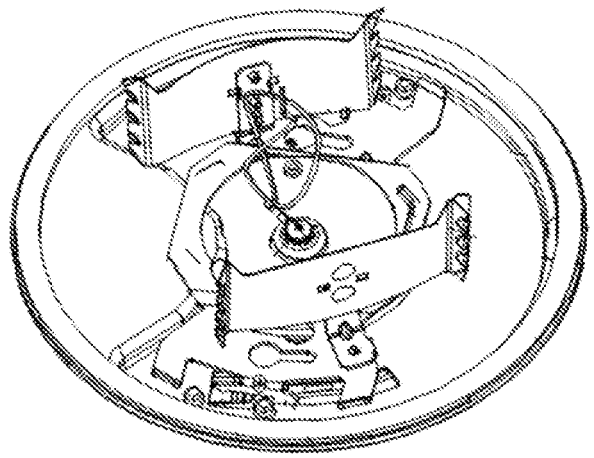
FIG. 82 illustrates a top view of a downlight example with the fixing bracket.
Figure 83:
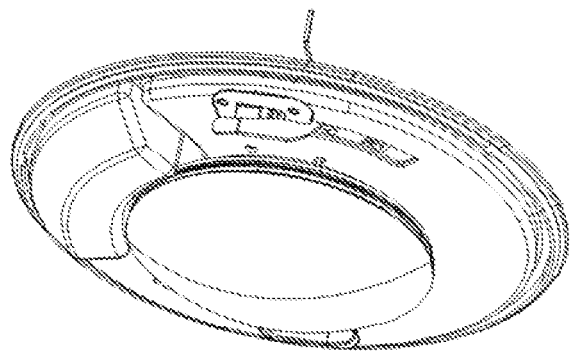
FIG. 83 illustrates another view of the example in FIG. 82.
Figure 84:
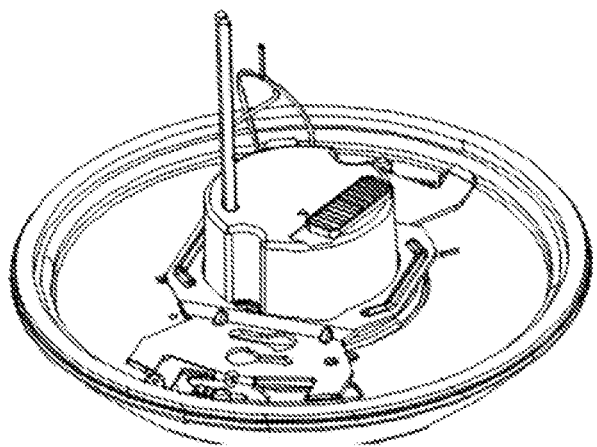
FIG. 84 illustrates a top view of another downlight example.
Figure 85:
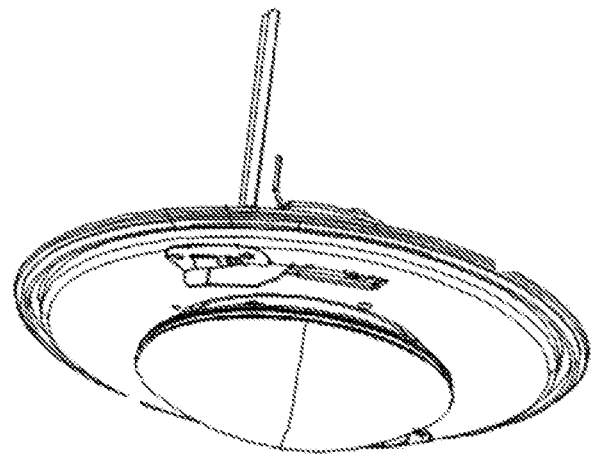
FIG. 85 illustrates another view of the example in FIG. 84.
Figure 86:
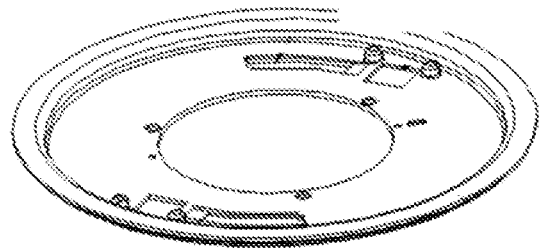
FIG. 86 illustrates a component in the example of FIG. 85.

FIG. 56 illustrates a torsion spring zoom-up view.
FIG. 57 illustrates another downlight example.
FIG. 58 illustrates a top view of the example in FIG. 57.
FIG. 59 illustrates another view of the example in FIG. 58.
FIG. 60 illustrates an exploded view of the example in FIG. 59.
FIG. 61 illustrates a connector example.
FIG. 62 illustrates a torsion spring zoom-up view.
FIG. 63 illustrates another downlight example.
FIG. 64 illustrates a top view of the example in FIG. 63.
FIG. 65 illustrates another view of the example in FIG. 64.
FIG. 66 illustrates an exploded view of the example in FIG. 65.
FIG. 67 illustrates an elastic plate example.
FIG. 68 illustrates a connector example.
FIG. 69 illustrates a side view of a diffusion cover and related components.
FIG. 70 illustrates a zoom-up view of the diffusion cover and related components.
FIG. 71 illustrates a rim part example.
FIG. 72 illustrates another view of the example in FIG. 71.
FIG. 73 illustrates a wiring unit example.
FIG. 74 illustrates an exploded view of the example in FIG. 73.
FIG. 75 illustrates a driver box with the wiring unit.
FIG. 76 illustrates a side view of the wiring unit.
FIG. 77 illustrates another view of the wiring unit.
FIG. 78 illustrates another view of the wiring unit.
FIG. 79 illustrates a fixing bracket example.
FIG. 80 illustrates another fixing bracket example.
FIG. 81 illustrates an elastic stop unit example.
FIG. 82 illustrates a top view of a downlight example with the fixing bracket.
FIG. 83 illustrates another view of the example in FIG. 82.
FIG. 84 illustrates a top view of another downlight example.
FIG. 85 illustrates another view of the example in FIG. 84.
FIG. 86 illustrates a component in the example of FIG. 85.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A downlight apparatus, comprising:
a driver box;
a light source;
a light housing with a light holder and a rim, wherein the light holder has a holder plate and a holder wall defining a holder cavity, wherein the light source is placed on an inner side of the holder plate in the holder cavity;
multiple leaf springs, wherein the multiple leaf springs are placed between the driver box and the light holder;
multiple shaft connectors; and
multiple pads, wherein each pad has a pad hole and a pad scraper surrounding the pad hole, wherein the pad scraper has a protruding part engaging an electric insulation layer on a top side of the holder plate, wherein the shaft connector sequentially passes through a spring hole of the leaf spring, the pad hole and the top plate of the light holder, wherein the protruding part of the pad scraper scrapes a portion of the electric insulation layer of the holder plate for connecting the holder plate to ground.

2. The downlight apparatus of claim 1, wherein the leaf spring has a spring head and spring tail, wherein the spring tail is rotated to extend outside the light holder.

3. The downlight apparatus of claim 1, wherein the shaft connector is a first screw.

4. The downlight apparatus of claim 3, wherein the first screw is rotated to carry the pad scraper to move for removing the portion of the electric insulation layer.

5. The downlight apparatus of claim 1, wherein when the leaf spring is rotated, the pad scraper is moved to erase the portion of the electric insulation layer.

6. The downlight apparatus of claim 1, wherein a bottom edge of the driver box has multiple rotation grooves for the spring tails to extend and moving the multiple rotation grooves.

7. The downlight apparatus of claim 6, wherein a limiting unit is placed between the driver box and the light holder for limiting rotation of the leaf springs.

8. The downlight apparatus of claim 1, wherein the pad scraper is a circular wave structure.

9. The downlight apparatus of claim 1, wherein the protruding part is roughened to increase friction.

10. The downlight apparatus of claim 1, wherein the pads and the shaft connectors are made of metal material.

11. The downlight apparatus of claim 1, wherein the spring tail is extended for engaging a platform cavity for keeping the downlight apparatus in the platform cavity.

12. The downlight apparatus of claim 1, wherein a driver plate is placed inside the driver box, wherein the driver plate is kept a distance from a bottom of the driver box and the light holder.

13. The downlight apparatus of claim 1, wherein the light source has a light source plate mounted with LED modules, wherein the light source plate is connected to the light holder to connect to the ground.

14. The downlight apparatus of claim 13, wherein multiple metal shafts are used for electrically connecting the light source plate and the light holder.

15. The downlight apparatus of claim 1, wherein the leaf spring engages a junction box to connect to the ground.

16. The downlight apparatus of claim 1, wherein the shaft connector is electrically connected to a ground electrode disposed inside the driver box.

17. The downlight apparatus of claim 1, wherein a top plate of the driver box has a wire socket and a manual switch, wherein the wire socket is connected to a power wire and the manual switch is used for adjusting a setting of the light source.

18. The downlight apparatus of claim 17, wherein the top plate of the driver box further has a rotation switch for continuously setting a maximum light intensity of the light source.

19. The downlight apparatus of claim 1, wherein a heat dissipation plate is placed between the light holder and the driver box for carrying away both heat of the driver box and the light source.

20. The downlight apparatus of claim 19, wherein the heat dissipation plate has a portion not covered by the light holder and the driver box.

* * * * *